(12) United States Patent
Anfinsen et al.

(10) Patent No.: US 8,465,785 B2
(45) Date of Patent: Jun. 18, 2013

(54) REDUCED DIGESTIBLE CARBOHYDRATE FOOD HAVING REDUCED BLOOD GLUCOSE RESPONSE

(75) Inventors: Jon R. Anfinsen, Alachua, FL (US); Bryan Craig Tungland, Becker, MN (US)

(73) Assignee: TechCom Group, LLC, Gainesville, FL (US)

( * ) Notice: Subject to any disclaimer, the term of this patent is extended or adjusted under 35 U.S.C. 154(b) by 0 days.

(21) Appl. No.: 12/913,923

(22) Filed: Oct. 28, 2010

(65) Prior Publication Data

US 2011/0038984 A1    Feb. 17, 2011

Related U.S. Application Data

(62) Division of application No. 10/967,800, filed on Oct. 18, 2004, now Pat. No. 8,128,977.

(60) Provisional application No. 60/481,518, filed on Oct. 16, 2003, provisional application No. 60/521,034, filed on Feb. 9, 2004.

(51) Int. Cl.
*A23L 1/16* (2006.01)

(52) U.S. Cl.
USPC .............. 426/557; 426/96; 426/451; 426/516

(58) Field of Classification Search
USPC .................................. 426/557, 96, 451, 516
See application file for complete search history.

(56) References Cited

U.S. PATENT DOCUMENTS

| | | | | |
|---|---|---|---|---|
| 3,992,554 A | * | 11/1976 | Blake et al. | 426/557 |
| 5,342,634 A | * | 8/1994 | Murata et al. | 426/113 |
| 6,180,148 B1 | * | 1/2001 | Yajima | 426/392 |
| 7,235,276 B2 | * | 6/2007 | Allen et al. | 426/549 |

OTHER PUBLICATIONS

Brennan et al, "Inulin-enriched pasta:effects on textural properties and starch degradation", Aug. 14, 2003, pp. 189-193.*
Patent Examination Report, official action in corresponding Australian Patent Application 2011213709 dated Oct. 17, 2012. (3pages).
Brennan, Dietary fibre, glycaemic response, and diabetes, Mol. Nutr. Food Res., 2005, vol. 49, pp. 560-570. (11 pages).
Nuttall et al., The Glycemic Response to Ingested Dreamfields Pasta Compared With Traditional Pasta, Nutrition Today, Sep./Oct. 2012, vol. 47, No. 5, pp. 222-223. (2 pages).
Tungland, Glycemic Response to Ingested Dreamfields Pasta, www.dreamfieldsfoods.com/downloads/DreamfieldsPastaGlycemicResults_v4_bt_6_10_11, Jun. 10, 2011, pp. 1-11. (11pages).

* cited by examiner

*Primary Examiner* — Lien T Tran
(74) *Attorney, Agent, or Firm* — Hasse & Nesbitt LLC; Daniel F. Nesbitt

(57) ABSTRACT

Reducing the digestion of digestible carbohydrates in a digestible carbohydrate-based material, and reducing the absorption of the digestion product(s) of digestible carbohydrates (that is, simple sugars) within the small intestine. The undigested digestible carbohydrate and the unabsorbed digestion products pass through the small intestines and into the colon, where they are fermented. In effect, the food materials made by practicing the present invention cause a controlled amount of digestible carbohydrate to by-pass the small intestine, resulting in the fermentation of digestible carbohydrates in the colon. The invention also provides for processing of a digestible carbohydrate-based ingredient with a non-digestible food film material, to form a reduced digestible carbohydrate food having a protective food film network, which can inhibit or prevent digestion of the digestible carbohydrate. The present invention also provides for processing of a digestible carbohydrate-based ingredient with a non-digestible food film material, to provide a resulting reduced digestible carbohydrate food containing a viscosity-building component that contributes to the formation of a viscous intestinal chyme that can inhibit or prevent digestion of the digestible carbohydrate and can inhibit adsorption of digestion products of digestible carbohydrates in the small intestine.

16 Claims, 3 Drawing Sheets

REDUCED DIGESTIBLE CARBOHYDRATE FOOD HAVING REDUCED BLOOD GLUCOSE RESPONSE

CROSS-REFERENCE TO RELATED APPLICATIONS

This application is a divisional application of U.S. application Ser. No. 10/967,800, filed Oct. 18, 2004 Now U.S. Pat. No. 8,128,977, which claims the benefit of U.S. Provisional Application No. 60/481,518, filed Oct. 16, 2003, and U.S. Provisional Application No. 60/521,034, filed Feb. 9, 2004, the disclosures of which are incorporated herein by reference.

BACKGROUND OF THE INVENTION

The present invention relates to foods and food ingredients containing digestible carbohydrates.

In 1985, the World Health Organization (WHO) estimated 30 million people worldwide had diabetes. By 1995, this number increased to 135 million. The estimated number rose again in 2000 to 177 million. This number is expected to reach 370 million by 2030. In 2000, seventeen million Americans were estimated to be diabetic. Diabetes in adults is now a global health problem. Populations of developing countries, minority groups, and disadvantaged communities in industrialized countries face the greatest risk.

The worldwide incidence of obesity, as defined by WHO, has soared from 12% to 18% in just the last seven years. Statistically, one in five of the world's population is obese. The US is presently the "fat capital", with more than 64% of the adult population being overweight. Results from the US 1999-2000 National Health and Nutrition Examination Survey (NHANES), indicate that an estimated 15 percent of children and adolescents (ages 6-19 years) are overweight.

Being either diabetic or overweight substantially raises the risk of mortality from hypertension, dyslipidemia, type 2 diabetes, coronary heart disease, stroke, gallbladder disease, osteoarthritis, sleep apnea, respiratory problems, and endometrial, breast, prostate, and colon cancers. In 2002, the estimated US healthcare costs attributed directly to the treatment of obesity and diabetes were approximately $200 billion annually.

A common factor related to these diseases is a malfunction in the metabolism of digestible carbohydrates. This malfunction causes abnormal levels of blood glucose and insulin. Insulin promotes the production and storage of fat. High average levels of glucose (>180 mg/di) in the blood stream will bind to organ proteins (glycosylation) resulting in the deterioration of organ function. A measure of glycosylation is the HbA1c blood test that defines the extent to which glucose is bound to hemoglobin. This measurement estimates the average level of glucose in the blood stream over the 3-month period prior to the test. HbA1c test results higher than 8.0% (>180 mg blood glucose/di) are an indicator of increased potential for organ damage that includes serious eye, cardiovascular, circulatory, kidney, and nerve diseases.

It is important for diabetics and those that are overweight or obese, to avoid foods with a high glycemic response, i.e. those that result in abnormally high levels of blood glucose soon after ingestion. Instead, diabetics and those controlling their weight require foods having a relatively low blood glucose response (glycemic response or index), which results in a slower rate of glucose release into the blood. Slowing the rate of release of glucose into the blood reduces the risk of both high blood glucose (hyperglycemia) and low blood glucose (hypoglycemia). It has been suggested that significant health advantages can be achieved if 2 hr postprandial (after a meal) blood glucose levels can be maintained as close to normal as possible (140 mg/dl). A problem in meeting this goal is experienced when large quantities of foods high in digestible carbohydrates are consumed. Such foods typically include bakery products, pastas, rice, snacks, potatoes, sauces, gravies, beverages, soups, casseroles and candies. These foods, containing high levels of digestible starch and/or sugars, especially when eaten in excess can significantly increase 2 hr postprandial blood glucose levels.

Appetite suppression is another reason for maintaining normal 2 hr postprandial blood glucose levels.

Herein lie the importance and the need to reduce blood glucose responses resulting from the consumption of popular foods containing high levels of digestible carbohydrates. Although there is no official definition of "high levels of digestible carbohydrates", the Food and Nutrition Board under the National Academies of Sciences' Institute of Medicine has set a Recommended Daily Allowance (RDA) for Total Digestible Carbohydrate for children and adults to be 130 g/day. It is apparent how this RDA is easily being surpassed by a large majority of the population when consuming their typical diets.

Diabetes is a malfunction in the metabolism of digestible carbohydrates caused by the body's inability to adequately produce or efficiently utilize insulin. Insulin is needed to facilitate the transport of blood glucose into cells where it is converted to energy. Failure to transport glucose into cells results in elevated blood glucose levels (normal fasting blood glucose levels are between 70 and 100 mg/di). There are two types of diabetic conditions: juvenile-onset diabetes (Type I) and the mature-onset diabetes (Type II). In Type I diabetes, the body does not produce insulin. The administration of insulin is necessary to lower blood glucose to normal levels. In Type II diabetes, either the body doesn't produce enough insulin or cells lose their ability to efficiently use insulin (insulin resistance) to facilitate the transport of glucose into cells.

Obesity is also a malfunction in the metabolism of digestible carbohydrates. High levels of blood insulin can result from self-administration or as a result of insulin resistance. When insulin resistance occurs, glucose levels rise signaling for the production of additional insulin. Thus blood insulin levels become excessive. In addition to insulin's role in regulating glucose metabolism, insulin stimulates the synthesis of fats (lipogenesis) and diminishes the breakdown (lipolysis) and conversion of fat to energy. Thus high levels of insulin increase fat production and storage causing conditions of overweight and obesity.

A primary approach for reducing blood glucose levels and related insulin levels is the strict adherence to a diet that minimizes postprandial glucose response. However, compliance to a diet that results in normal blood glucose levels is difficult since the majority of foods consumed daily in a typical diet have high levels of digestible carbohydrates. Consequently, food products and dietary management systems are needed to help control and maintain blood glucose levels to as close to normal as possible, in order to reduce the incidence and complications of diabetes. More specifically, there is a need for low digestible carbohydrate versions of highly consumed, conventional, starchy, sugary, food products.

It can be concluded that being overweight or having diabetes poses a major public health challenge. These diseases are epidemic and represent leading causes of death worldwide. They also are primarily caused by malfunction in the metabolism of digestible carbohydrates. Reducing the digestion and absorption of digestible carbohydrates in the small intestine can 1) help promote weight loss and control, 2) help reduce the incidence of Type II diabetes, 3) reduce the morbidity and mortality resulting from diabetes and conditions of obesity, 4) promote better health, and 5) reduce healthcare costs.

It is common art to produce foods containing low levels of digestible carbohydrates by diluting their levels in foods with food ingredients that are not glycemic (do not produce a blood glucose response). Typically foods with high levels of digestible carbohydrate are diluted with proteins, dietary fibers, fats, and resistant starches. The dilution approach to producing low glycemic foods has several disadvantages: 1) the cost of the digestion-resistant carbohydrate material is usually significantly more expensive due to replacing low cost digestible carbohydrates with ingredients that are typically 5 to 15 times more expensive, 2) the low digestible carbohydrate foods usually don't have the same consumer acceptance as foods with higher levels of digestible carbohydrates and 3) compliance to a diet utilizing non-standard foods can be difficult due to poor organoleptic quality, limited availability of low carbohydrate foods needed to provide adequate nutrition as well as necessary eating enjoyment.

SUMMARY OF THE INVENTION

The present invention relates to a reduced digestible carbohydrate food comprising: 1) at least 50% by weight of available carbohydrate, wherein the available carbohydrate comprises at least 15% protected carbohydrate, and 2) a non-digestible protective material.

The present invention also relates to a reduced digestible carbohydrate food comprising: 1) a available carbohydrate comprising a protected carbohydrate, and 2) a non-digestible protective material comprising, by weight: a) at least 10% of at least one of (i) a structural/viscous fermentable material selected from the group consisting of carrageenan, furcellaran, alginate, gum arabic, gum ghatti, gum tragacanth, karaya gum, guar gum, locust bean gum, tara gum, tamarind gum, inulin, arabinoxylans, b-glucans, xyloglucans, pectin, cellulose, curdlan, dextran, gellan gum, rhamsan gum, scleroglucan, welan gum, xanthan gum, gelatin, carboxymethylcellulose, hydroxypropyl cellulose, hydroxypropyl methyl cellulose, hydroxyethyl cellulose, propylene glycol alginate, hydroxypropyl guar, modified starches, and mixtures thereof, (ii) a structural protein polymer selected from the group consisting of gluten, modified gluten, casein, soy, whey concentrate, chitosan, amylose, and mixtures thereof; and b) at least 35% of a rheology modifier selected from the group consisting of a low molecular weight saccharide such as glycerin, fructose, a fructooligosaccharide, a polyol, inulin having a degree of polymerization (DP) from about 2-20 and an average DP of about 4-7, an oligosaccharide, gum arabic, and partially hydrolyzed guar gum.

The present invention also relates to a reduced digestible carbohydrate food made from a dough, the dough being made by admixturing: 1) a digestible carbohydrate-based ingredient that comprises digestible carbohydrate, and 2) a non-digestible protective material. The non-digestible protective material comprises, by weight: a) at least 10% of at least one of: (i) a structural/viscous fermentable material selected from the group consisting of carrageenan, furcellaran, alginate, gum arabic, gum ghatti, gum tragacanth, karaya gum, guar gum, locust bean gum, tara gum, tamarind gum, inulin, arabinoxylans, b-glucans, xyloglucans, pectin, cellulose, curdlan, dextran, gellan gum, rhamsan gum, scleroglucan, welan gum, xanthan gum, gelatin, carboxymethylcellulose, hydroxypropyl cellulose, hydroxypropyl methyl cellulose, hydroxyethyl cellulose, propylene glycol alginate, hydroxypropyl guar, modified starches, and mixtures thereof, (ii) a structural protein polymer selected from the group consisting of gluten, modified gluten, casein, soy, whey concentrate, chitosan, amylose, and mixtures thereof; and b) at least 35% of a rheology modifier selected from the group consisting of a low molecular weight saccharide such as glycerin, fructose, a fructooligosaccharide, a polyol, inulin having a degree of polymerization (DP) from about 2-20, and an average DP of about 4-7, an oligosaccharide, gum arabic, and partially hydrolyzed guar gum.

The present invention also relates to a reduced digestible carbohydrate food having a matrix structure, comprising: 1) a available carbohydrate comprising a protected carbohydrate, and 2) a non-digestible protective material that forms a food film network within the matrix, the non-digestible protective material having a breaking strength values of greater than about 50 dynes/cm$^2$, and a elongation to break of at least about 10%, and a viscosity of at least about 500 cP at a 10% concentration by weight in water, at 20° C.

The present invention also relates to a reduced digestible carbohydrate food having a matrix structure, comprising: 1) a digestible carbohydrate-based ingredient in the form of discrete units, the ingredient comprising a available carbohydrate, where a portion of the available carbohydrate comprises a protected carbohydrate, and 2) a non-digestible protective material that forms a food film network that surrounds the discrete units, to provide digestion resistance to the protected carbohydrate.

The present invention also relates to a method of making a reduced digestible carbohydrate ingredient, comprising the steps of: 1) providing a digestible carbohydrate-based ingredient comprising an amount of available carbohydrate, 2) providing a non-digestible protective hydrocolloid mixture, and 3) shearing the digestible carbohydrate-based ingredient with the non-digestible hydrocolloid mixture under conditions of shear sufficient to form the reduced digestible carbohydrate ingredient having a carbohydrate digestion resistance of at least 10%.

The present invention also relates to a method of making a reduced digestible carbohydrate ingredient, comprising the steps of: 1) providing a digestible carbohydrate-based ingredient comprising a available carbohydrate and an intrinsic non-digestible hydrocolloid, and 2) shearing the digestible carbohydrate-based ingredient under conditions of shear sufficient to form the reduced digestible carbohydrate ingredient having a carbohydrate digestion resistance of at least 10%.

The present invention also relates to a method of reducing the blood glucose response of a meal, comprising the steps of: 1) providing a reduced digestible carbohydrate food comprising an effective amount of a non-digestible protective ingredient, 2) providing a second food comprising digestible carbohydrate, 3) consuming a meal comprising the reduced digestible carbohydrate food and the second food, and 4) co-digesting the foods or the meal, whereby non-digestible protective ingredient protects the digestible carbohydrate in the second food from digestion and reduces the blood glucose response of the second food.

The present invention also relates to a reduced digestible carbohydrate food, made from a digestible carbohydrate-based ingredient comprising digestible carbohydrate, and a non-digestible protective material, wherein the glycemic load of the reduced digestible carbohydrate food is at least 30% less than the glycemic load of a conventional food made from the digestible carbohydrate-based ingredient, excluding any dilution of the reduced digestible carbohydrate food by the non-digestible protective material.

The present invention also relates to a reduced digestible carbohydrate food, made from a digestible carbohydrate-based ingredient comprising digestible carbohydrate, and a non-digestible protective material, wherein the glycemic index of the reduced digestible carbohydrate food is at least 30% less than the glycemic index of a conventional food made from the digestible carbohydrate-based ingredient, excluding any dilution of the reduced digestible carbohydrate food by the non-digestible protective material.

The present invention also relates to a non-digestible protective food additive, comprising by weight: a) at least one of: (i) a structural/viscous fermentable material selected from the group consisting of carrageenan, furcellaran, alginate, gum arabic, gum ghatti, gum tragacanth, karaya gum, guar gum, locust bean gum, tara gum, tamarind gum, inulin, agar, konjac mannan, arabinoxylans, b-glucans, xyloglucans, pectin, cellulose, curdlan, dextran, gellan gum, rhamsan gum, scleroglucan, welan gum, xanthan gum, gelatin, carboxymethylcellulose, hydroxypropyl cellulose, hydroxypropyl methyl cellulose, hydroxyethyl cellulose, propylene glycol alginate, hydroxypropyl guar, modified starches, and mixtures thereof, and (ii) a structural protein polymer selected from the group consisting of gluten, modified gluten, casein, soy, whey concentrate, chitosan, amylose, and mixtures thereof; and b) a rheology modifier selected from the group consisting of a low molecular weight saccharide such as glycerin, fructose, a fructooligosaccharide, a polyol, inulin having a degree of polymerization (DP) from about 2-20 and an average DP of about 4-7, an oligosaccharide, gum arabic, and partially hydrolyzed guar gum.

The present invention also relates to a use of the above food additive, for reducing the blood glucose response of a food to which it is added.

The present invention also relates to a reduced digestible carbohydrate flour in particulate form, comprising: 1) a digestible carbohydrate-based flour, and 2) a non-digestible protective ingredient.

The present invention also relates to a reduced digestible carbohydrate pasta comprising: a) the grain flour is selected from the group consisting of flours of wheat, rye, barley, oat, sorghum, rice, corn, and potato, and b) a non-digestible protective material selected from the group consisting of: (1) at least one of: (i) a structural/viscous fermentable material selected from the group consisting of carrageenan, furcellaran, alginate, gum arabic, gum ghatti, gum tragacanth, karaya gum, guar gum, locust bean gum, tara gum, tamarind gum, inulin, agar, konjac mannan, arabinoxylans, b-glucans, xyloglucans, pectin, cellulose, curdlan, dextran, gellan gum, rhamsan gum, scleroglucan, welan gum, xanthan gum, gelatin, carboxymethylcellulose, hydroxypropyl cellulose, hydroxypropyl methyl cellulose, hydroxyethyl cellulose, propylene glycol alginate, hydroxypropyl guar, modified starches, and mixtures thereof, (ii) a structural protein polymer selected from the group consisting of gluten, modified gluten, casein, soy, whey concentrate, chitosan, amylose, and mixtures thereof; and (2) a rheology modifier selected from the group consisting of a low molecular weight saccharide such as glycerin, fructose, a fructooligosaccharide, a polyol, inulin having a degree of polymerization (DP) from about 2-20 and an average DP of about 4-7, an oligosaccharide, gum arabic, and partially hydrolyzed guar gum.

DETAILED DESCRIPTION OF THE INVENTION

Definitions

Figure 1:
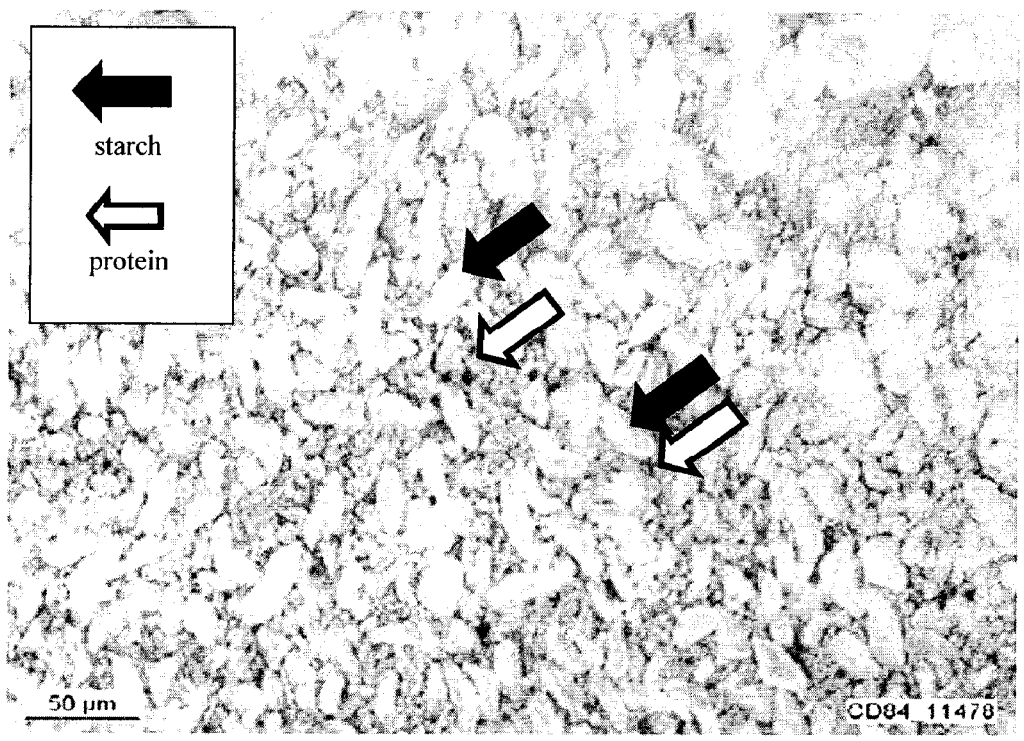
FIG. 1 shows a bright field illumination microscopic image of a conventional pasta cooked to al dente.

As used herein, the term "total carbohydrate" refers to the mass of digestible carbohydrate and dietary fiber material in a food or food ingredient. A traditional method of determining the total carbohydrate level in a food is to analytically subtract out the fats, proteins, moisture and ash (minerals).

As used herein, the terms "available digestible carbohydrate" and "available carbohydrate" refer to carbohydrate that is ordinarily digestible in the environment of the small intestines. The terms are also defined as the "total carbohydrate" minus dietary fiber, which are not digestible. Available carbohydrate typically includes monosaccharides, oligosaccharides and polysaccharides.

As used herein, the term "digested carbohydrate" is the digestible carbohydrate in a food that are actually digested in the small intestines; that is, they are enzymatically broken down in the small intestines into simple sugars and absorbed into the blood stream. The digested carbohydrates are the portion of the available carbohydrates that are digested in the small intestines.

As used herein, the term "protected carbohydrate" is the portion of the available carbohydrate in the food that is protected or prevented from being digested in the small intestines, and carries over into the colon. The protected carbohydrate is a digestible carbohydrate is protected from being digested.

The present invention provides for reducing the digestion of digestible carbohydrates such as disaccharides, oligosaccharides, and polysaccharides including starches, found in food products and food ingredients. Sugars, cereals, and roots are primary sources of digestible carbohydrates. Vegetables, fruits, milk products, legumes and pulses are also common contributors of digestible carbohydrates to the diet.

The invention also provides for preventing absorption, through the wall of the small intestine and into the blood stream, of the digestion products of a portion of the digestible carbohydrates (that is, absorbable sugars) from an ingested food, as well as of the sugars present in the food prior to ingestion.

In the digestion process, the polysaccharides and oligosaccharides from an ingested food must be broken down with alpha-amylase to disaccharides in the small intestine. The disaccharide, as the resulting degradation product of a starch or oligosaccharide, and other resident disaccharides in the food, are broken down to monosaccharides by hydrolases attached to the intestinal brush-border membrane, and the monosaccharides are absorbed through the wall of the small intestine and into the blood stream.

Reducing the digestion of a portion of the digestible carbohydrates in a food reduces the glycemic response of that food. The glycemic response of a food is the incremental area under the blood glucose curve resulting from the ingestion of a serving amount of a test or subject food. A level of glucose that equals the blood glucose response of the serving of the food is the glycemic load of the serving of food, expressed as grams of glucose. The glycemic load of the food serving is equivalent to the level of digestible carbohydrate in the food product that is digested, also expressed in grams.

Consequently, the present invention also provides attenuation of blood glucose levels by limiting the digestion and adsorption of available digestible carbohydrates within the small intestine. Without being limited to any particular theory, it is believed that the protected carbohydrates pass through the small intestine and into the colon, causing the blood glucose, blood lipid and caloric contributions of the digestible carbohydrate-containing food to be reduced, and the food's fiber effects to be enhanced. The protected carbohydrate is a digestible carbohydrate that is available and amenable to digestion, but which is not digested and absorbed in the small intestines as a result of the processing of non-digestible protective ingredients into the food product.

One embodiment of the present invention relates to reduced digestible carbohydrate foods and to methods for their making, by the use of a non-digestible hydrocolloid material to provide carbohydrate digestion resistance for available digestible carbohydrates in the food, and a reduced glycemic response to the food. Processing a digestible carbohydrate-based ingredient with a non-digestible hydrocolloid material, can reduce the level of actual digested carbohydrate from the resulting food. The digestible carbohydrate-based ingredient can include fruit and vegetable flours, including grains such as wheat and barley, grasses such as corn and rice, legumes such as soy beans, beans, and yellow chickpeas, and tubers such as potatoes. The present invention provides several means for reducing the glycemic response of a food, or a food ingredient, containing digestible carbohydrates.

Protecting Carbohydrates from Digestion:

The invention relates to the use of a Non-Digestible Material (NDM), typically comprising a hydrocolloid, to provide protection to a portion of a digestible carbohydrate of a carbohydrate-based food ingredient. The Non-Digestible Material is typically processed with the carbohydrate-based food ingredient to convert a portion of the available carbohydrate into a protected carbohydrate. The protection can reduce the glycemic effect of the resulting food.

The glycemic effect of a food containing digestible carbohydrate can therefore be controlled by using the Non-Digestible Ingredient in several ways.

Non-Digestible Food Film Component and Network:

First, the Non-Digestible Material can be used as a non-digestible Food Film Component (FFC), to form a Food Film Network (Food Film Network), thereby modifying the matrix of the resulting Reduced Digestible Carbohydrate Food (RDCF). Modifying the food matrix with a Food Film Network can block the action of carbohydrate-digesting enzymes, for example, by coating or encapsulating the cells of digestible carbohydrates. The digestible carbohydrate portion in the Reduced Digestible Carbohydrate Food that can not be digested in the gastrointestinal tract is the Protected Carbohydrate (PC).

The level of Protected Carbohydrate (PC), compared to the available digestible carbohydrate in a consumed food material, can be expressed as:

$$PC(\%) = 100 * (B-A)/B \quad (I),$$

wherein A is the amount of digested carbohydrate (digestible carbohydrate that is digested and absorbed in the small intestine), and the B is the total available digestible carbohydrate in the consumed food. The amount of digested carbohydrate that is digested and absorbed in the small intestine is determined by the in vivo Blood Glucose Response Method described herein after, which uses the blood glucose response to the food's digestion. The available carbohydrate is the sum of the protected carbohydrate and the unprotected, digested carbohydrate. The amount of available carbohydrate contained in the consumed food can be determined as the sum of digestible carbohydrates in the food ingredients used to form the consumed food, assuming these are established and known. This amount of digestible carbohydrate can also be determined by an analytical method that chemically and/or enzymatically breaks down all oligosaccharides and polysaccharides into simpler sugars, regardless of any protective food film that may be present in the food, and detects the total level of sugars. The portion of the available carbohydrates that are Protected Carbohydrates can also be termed the Carbohydrate Digestion Resistance (CDR) of the food product containing the available digestible carbohydrates. Unless otherwise stated, any numerical representation, such as by weight percentage or other, of the protected carbohydrate content of a food ingredient or product, or of the digested portion of the available carbohydrates, is determined by the in vivo Blood Glucose Response Method.

The present invention provides resistance to digestion of the amount of available carbohydrate contained in a reduced digestible carbohydrate food. Generally, the carbohydrate digestion resistance (CDR) is at least 10%, typically at least 15%, more typically 20%, more typically 30%, even more typically 50%, and most typically at least 80%. More effective embodiments of the invention can provide a CDR of typically at least 90%, and more typically at least 95%. The carbohydrate digestion resistance (CDR) can be up to 100%, more typically up to 98%, and even more typically up to 95%.

Second, the Non-Digestible Material can be used as a Viscosity Building Component to increase the viscosity of gastrointestinal contents, causing the formation of a viscous chyme in vivo during the digestion process. Without being bound by any particular theory, it is believed that the Viscosity Building Component causes the entrapment of small molecular weight sugars within the contents of the chyme, which hinders their diffusion and migration, thereby reducing the absorption of digestible carbohydrate components through the intestinal wall.

Third, the invention provides a means for reducing the glycemic response of a food containing digestible carbohydrates by a dilution of the level of digestible carbohydrates in the digestible carbohydrate-based food ingredient with the added non-digestible protective ingredient, as well as other non-digestible food components, such as resistant starches, fibers, proteins, and lipids. These other non-digestible food components can also optionally be included as part of the non-digestible Food Film Component that can form the protective food film network or as part of a Viscosity Building Component. This dilution reduces the mass percent or level of digestible carbohydrate in the food, and the food's glycemic effects. By weight, the resulting reduced digestible carbohydrate food with the non-digestible protective ingredient has a reduced amount of digestible carbohydrate. In a typical embodiment of the invention, the dilution effect of the added non-digestible protective ingredient is typically only a small portion of the reduction in digestible carbohydrate and glycemic response, compared to the reduction provided by the protective aspects of the invention.

And fourth, the Non-Digestible Material can be used to cause the protected digestible carbohydrate, that has not been digested and absorbed in the small intestines, to pass to the colon where it can be fermented to produce short chain fatty acids (SCFAs) that can influence positive control of carbohydrate and lipid metabolism in the liver.

The present invention provides a reduced digestible carbohydrate food comprising: an available digestible carbohydrate comprising a protected carbohydrate and optionally a digested carbohydrate, and a non-digestible protective material. Typically the Non-Digestible Material comprises a non-digestible hydrocolloid. The present invention can provide a reduced digestible carbohydrate food that typically has a weight ratio of available digestible carbohydrate to Protected Carbohydrate of at least 10:1, more typically at least about 5:1, more typically at least 3:1, and even more typically at least about 1:9. The present invention can further provide a food that has a weight ratio of available digestible carbohydrate to Protected Carbohydrate of up to 1:100, and more typically up to 1:50. Alternatively, the available carbohydrate can comprise at least about 10% protected carbohydrate, typically at least about 30% protected carbohydrate, more typically at least about 50% protected carbohydrate, even more typically at least about 70% protected carbohydrate, even more typically at least about 90% protected carbohydrate, and can have up to about 100% protected carbohydrate, more typically up to about 98% protected carbohydrate, and even more typically up to about 95% protected carbohydrate. The reduced digestible carbohydrate food typically comprises about 15 gm and less of digested carbohydrate, per standardized serving of the reduced digestible carbohydrate food, more typically 810 grams or less, and even more typically 5 gm or less.

The Non-Digestible Material and the resulting Food Film Network can be made into or from a variety of food forms, including, without limitation, dough and baked or cooked product therefrom, dried powders, flakes, particles, strands, as well as noodles and shells; baked goods and nutritional bars; liquids and viscous compositions, such as glazes and dips; and gels and semi-solids.

Non-Digestible Food Film Network:

A first means of blocking the action of carbohydrate-digesting enzymes to digest available digestible carbohydrates within the digestion system is to provide a non-digestible Food Film Network within the matrix or microstructure of the reduced digestible carbohydrate food. An embodiment of the present invention relates to a reduced digestible carbohydrate food having a Food Film Network, and to the use of the Non-Digestible Material in the processing of digestible carbohydrate-based ingredients to provide a protective food film network. The Food Film Network is comprised of a non-digestible food film component, which can be produced and processed into a digestible carbohydrate-based ingredient to provide a portion of the available digestible carbohydrate as protected carbohydrate. The protective food films of the network are typically not digestible in the gastric juices and within the digestive environment of the small intestine, which is inhabited by carbohydrate-digesting enzymes, such as pancreatic amylase, alpha-dextrinase, maltase, sucrase, and lactase. During the processing, the matrix or microstructure of the digestible carbohydrate-based ingredient is typically modified to entrap, coat and add greater complexity to the contained digestible carbohydrate, as well as other food components such as proteins, lipids, etc. The units, or layers of the digestible carbohydrate-based ingredient are dispersed within the Food Film Network. The matrix or microstructure of the carbohydrate-based ingredient can be evaluated microscopically to assess its level of complexity and show the effects of the Food Film Network on the matrix of the digestible carbohydrate-based ingredient. Various staining techniques, when used to stain prepared cryo-cross-sections of carbohydrate-based ingredients, and used under specific microscopic conditions, can allow proteins, starch (carbohydrate) granules and the Food Film Network to be seen more easily. The technique assists the researcher to identify the components' interactions, and their influence on the microstructure of the digestible carbohydrate-based ingredient, as well as the influence of the Food Film Network on the digestibility of the starch granules.

Bright Field Illumination Microscopic Determinations of Pasta Samples:

By example, cooked spaghetti can be frozen on a freezer folder of a cryostat (Cryo-Cut Microtome, American Optical Corporation) to −20° C. and subsequently cut into sections of a thickness of 10 microns (spaghetti pieces are cross-sectionally cut). The sections can then be stained with appropriate stains to empathize Food Film Network and components of the carbohydrate-based ingredient's matrix or microstructure, i.e. protein, starch granule or hydrocolloid-based food film. A toluidine blue staining procedure can be used to show more distinctly the proteins and other polymers, like the hydrocolloids used in the invention. The stained cross-sections are then evaluated using bright field illumination microscopy (BFIM). To evaluate the Food Film Network complexity, the food film is stained by using a mixture of 1 part of aqueous 1% toluidine blue, 1% sodium tetraborate with 1 part glycerol 20%. A 10 micron cross-section can be placed on a glass microscope slide and completely covered by the mixture. The cross-sections are allowed to stain for 10 seconds and then the slide is tilted to allow the stain to run off. The stained cross-sections are then gently washed with glycerol 20%, and then mounted in glycerol 20% prior to examination by BFIM.

Figure 2:
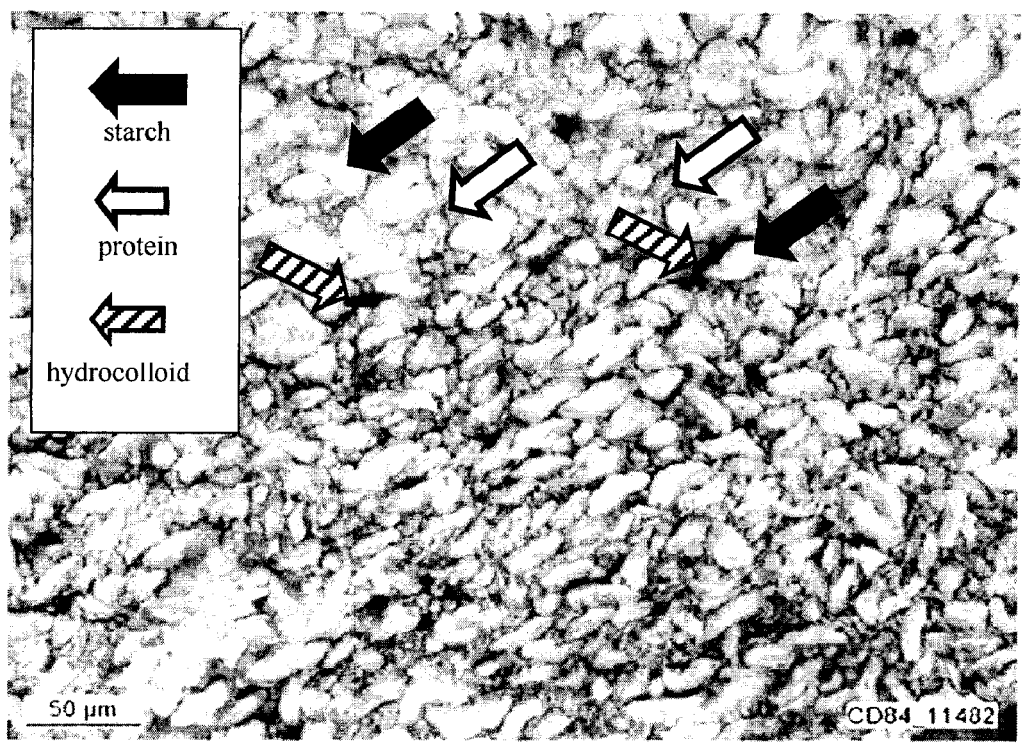
FIG. 2 shows a bright field illumination microscopic image of a pasta made according to the present invention.

Using standard techniques and conditions for BFIM, those having been educated to use microscopic technique can use a Leica DM 5000 B microscope or the like and produce results consistent with the observations. The microscopic images can be captured using a Leica DC500 digital camera fitted to the eye piece of the microscope, and an appropriate capture imaging software, such as Imagic ImageAccess 4 software, can be used to view the images. Images shown in FIGS. 1 and 2 are resultant BFIM micrographs of tolulidine blue stained cooked pasta. FIG. 1 shows a conventional pasta cooked to al dente, while FIG. 2 compares a pasta made according to the present invention, having a formula of Example 2A.

FIG. 1 shows that the conventional pasta's starch granules (shown as black arrow heads, but in the actual micrograph as light purple areas) are swollen, have unclear surface contours, and have a thin protein network (shown as white arrows, but in the actual micrograph in violet) that shows little "free" space between starch granules. Some direct granule-to-granule interaction exists. By comparison, FIG. 2 of pasta incorporating the hydrocolloids of the present invention, have starch granules (shown as black arrow heads, but in the actual micrograph as light purple areas) that are less swollen, and surface contours that are clearly visible with starch granules having no direct contact with one another. Further, there exits a thick "spacing" between the starch granules competing for space with the starch granules resulting from a thick, highly complex hydrocolloid/protein (non-digestible) network in between the starch granules. In FIG. 2, the protein is shown with a white arrow and the hydrocolloid with a hashed arrow, while in the actual micrograph, the protein appears violet and the hydrocolloid film appears dark violet.

Figure 3:
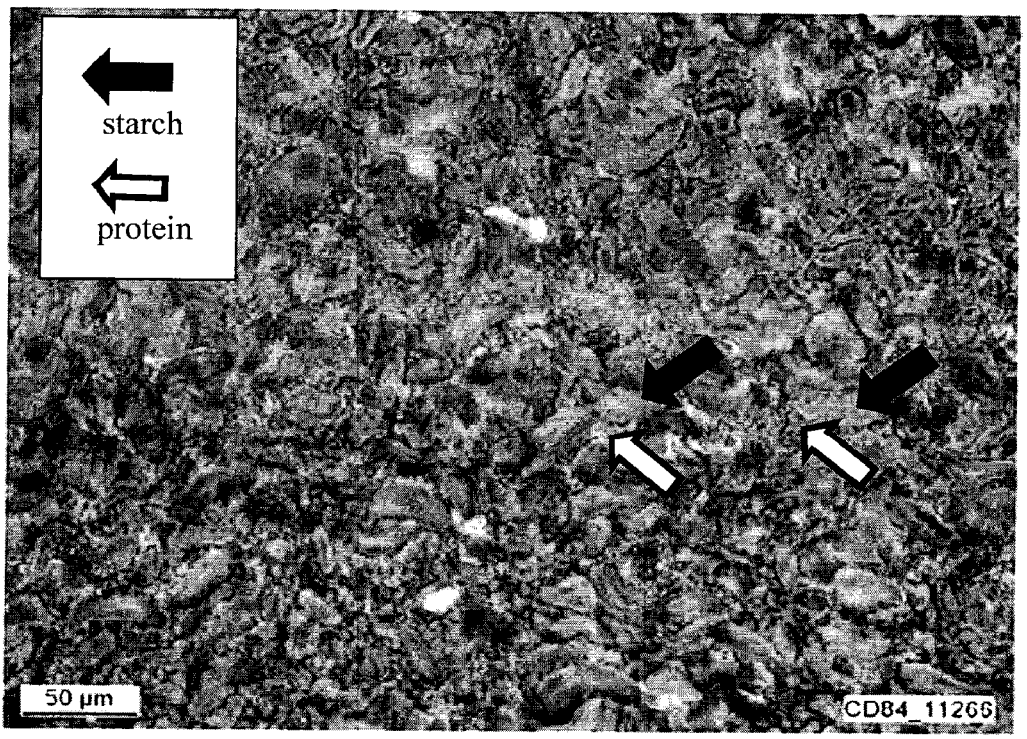
FIG. 3 shows a bright field illumination microscopic image of the conventional pasta using a two-stage staining procedure.
Figure 4:
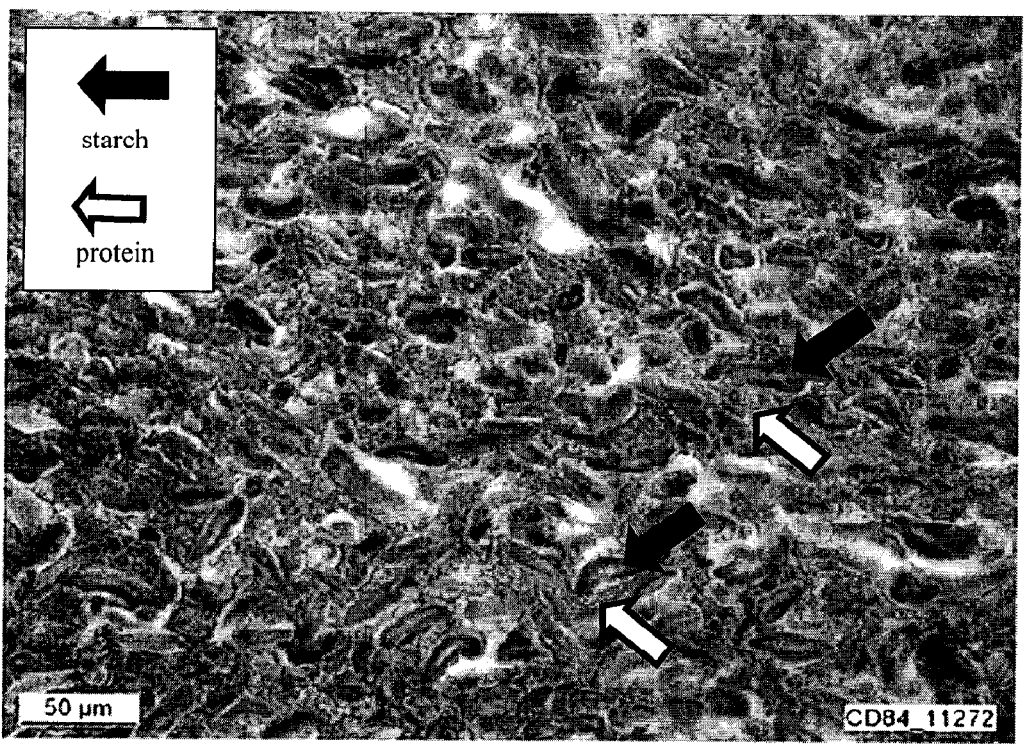
FIG. 4 shows a bright field illumination microscopic image of the pasta made according to the present invention using the two-stage staining procedure.

To further elucidate the food film network, a two-stage staining procedure is used that incorporates two different stains to add contrast between the starch granules and the protein network. During this dual-sequential staining procedure, the protein is stained first, followed by starch staining. The protein in the pasta cross-section is first stained using a mixture of 1 part of 2% aqueous Light green yellowish (Fluka AG, Buchs) with 3 parts aqueous glycerol 20%. Frozen cross-sections can be placed on a glass microscope slide and covered completely with the mixture, and allowed to stain for 1 minute. After one minute the stain is allowed to run off, and the stained cross-section is gently washed with deionized water. Following protein staining, the starch granules can be stained using a mixture of 1 part Lugol's solution (Merck) with 2 parts aqueous glycerol 85%. The protein-stained cross-sections from the previous staining stage are completely covered with the Lugol's mixture and allowed to stain for 10 seconds. The slide is then tilted to allow the stain to run off, and the stained cross-section is gently washed with 20% glycerol. The dual-stained cross section is mounted in glycerol 20% for subsequent examination using bright field illumination microscopy. FIGS. 3 and 4 are examples of BFIM micrographs of the dual-staining procedure for starch granules and protein. FIG. 3 shows a conventional pasta cooked to al dente, while FIG. 4 shows a pasta incorporating the present invention, having the formula shown of Example 2A. The conventional cooked pasta shows a significant number of swollen starch granules (particularly in the upper half) without distinct surface contours. Significantly more starch granule matter (shown as black arrows, but appearing in the actual micrographs in violet color) can be observed in the micrograph rather than protein network (shown as white arrows, but appearing in the actual micrograph as green color). This signifies a high density of swollen/gelatinized starch in the cooked pasta made without the hydrocolloids of the present invention, and indicating a less developed food microstructure. The micrograph of cooked pasta made using the present invention and shown in FIG. 4, by comparison, shows significantly less swollen or gelatinized starch granules, and also have distinct surface contours, signifying good intact surface structure in the starch granules. Further, the pasta incorporating the hydrocolloids of the present invention has significantly thicker layers between the granules, stained as green for protein network. The pasta's microstructure is shown to have about as much protein network as starch granules, indicating a significantly lower density (less swelling) of starch granules as compared to the conventional pasta in FIG. 3. The pasta of FIG. 4 using the hydrocolloids of the present invention also has a significantly lower number of swollen or gelatinized granules. The use of the present invention in food products develops a more highly structured food matrix or food microstructure.

Figure 5:
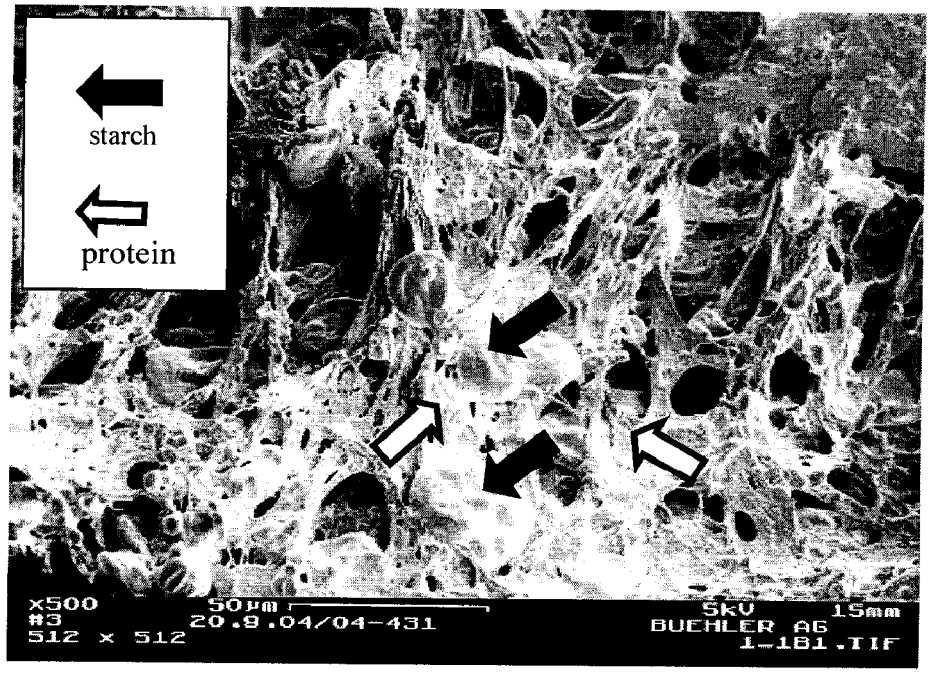
FIG. 5 shows a scanning electron microscopic image of the conventional pasta.
Figure 6:
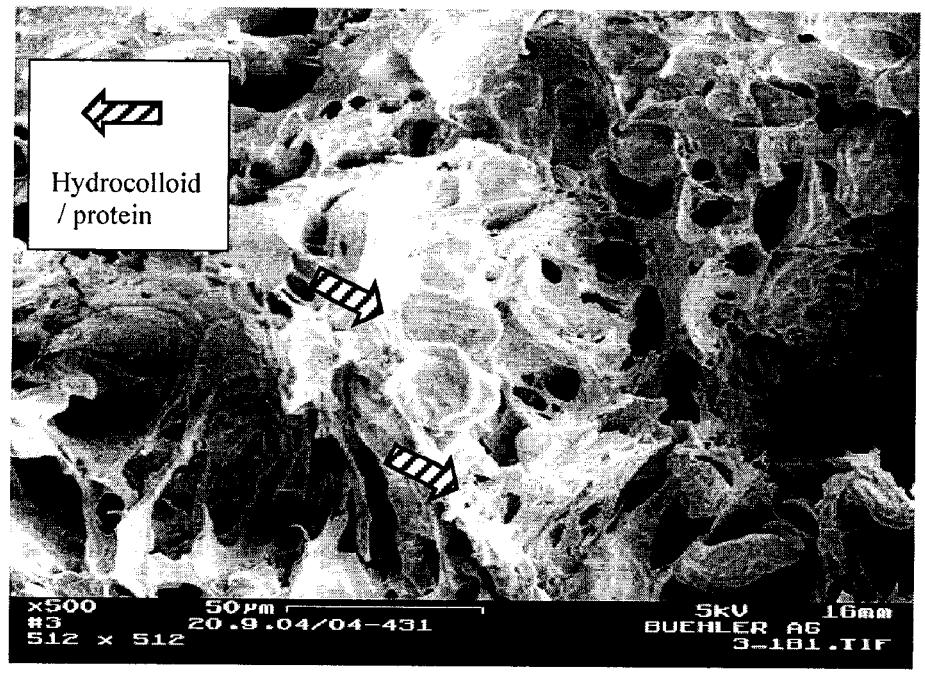
FIG. 6 shows a scanning electron microscopic image of the pasta made according to the present invention.

Scanning Electron Microscopic (SEM) Determinations of Pasta Samples:

To further illustrate the food matrix definition and complexity using the hydrocolloids of the present invention, cooked pasta cross-sections from conventional pasta (made without the hydrocolloids of the present invention) and pasta made with hydrocolloids of the present invention (having the formula of Example 2A), were evaluated using scanning electron microscopy (SEM). To evaluate the sections using SEM, the pasta samples are cooked and frozen in liquid nitrogen. Before analyzing the samples in the SEM (Zeiss DSM 962) they are freeze-dried in a Heto CT 60e freeze dryer. The freeze-dried pasta samples can then be broken down to expose internal surfaces, as defined in ordinary art for SEM technique. The samples can then be mounted on stubs using glue. The mounted samples can then be sputter-coated with gold in a BAL-TEC SCD 005 Sputter coater using established techniques well known to those skilled in the art of SEM analysis. The gold sputter-coated samples can then be analyzed at an acceleration voltage of 5 kV. Images can be captured using Zeiss SEM software system, or the like, that is integrated into the SEM. FIGS. 5 and 6 show SEM results of the two cooked pasta samples. FIG. 5 shows a conventional pasta with starch granules as clear/distinct disks (shown as black arrows). The granule sizes vary from quite small (<10 microns diameter) to larger, more observable disks of about 40 microns. Starch granules are clearly visible inside and on the surface of the protein network (shown as white arrows). The pasta microstructure is less dense and complex than that shown in FIG. 6, which shows pasta made according to the present invention (having the formula of Example 2A). FIG. 6 shows a more diverse and complex microstructure that does not have clearly visible starch granules. Conversely, most of the starch granules are completely coated and are integrated or entrapped within the protein/hydrocolloid matrix (the visible structure of the SEM is essentially all protein/hydrocolloid matrix).

It is believed that starch granules (digestible carbohydrate) that have been entrapped and coated by non-digestible material components of the Food Film Network are less accessible to attack by digestive enzymes of the small intestine. The Food Film Network provides a protective, edible, digestion-resistant material that surrounds and coats, and segregates, the digestible carbohydrate-based ingredient into the multitude of discrete, protected units and/or layers of digestible carbohydrate material. The Food Film Network further becomes impregnated into fissures or cracks of the carbohydrate-based food particles, and can orient between food units and layers to serve as a filler or binder. The resulting Food Film Network resists disintegration and digestion in gastric media, and forms a protective barrier against carbohydrate-digesting enzymes by encapsulating, coating and segregating the digestible carbohydrate from digestive enzymes. It is believed that the plasticity of the Food Film Component of the network can also encapsulate, coat and segregate the digestive enzymes in the chyme from the digestible carbohydrate. The available digestible carbohydrate that is protected by the Food Film Network from digestion (by pancreatic amylase enzymes) and absorption (as absorbable sugars in the gastrointestinal system) becomes a protected carbohydrate. The protection of the available digestible carbohydrate is believed to result in attenuation of the caloric, postprandial glycemic, and hyperlipidemic responses to ingestion of the food.

The non-digestible Food Film Component is selected to provide optimum film performance and properties. A preferred Food Film Network is produced from thin, strong, acid-stable, viscoelastic films that are extensible, continuous and capable of coating the particulate digestible carbohydrate material, and that are impervious to digestive enzymes until entering the colon. The Food Film Network can be prepared and incorporated into the digestible carbohydrate-based ingredient, and into foods that contain the digestible carbohydrate-based ingredient. The resulting reduced digestible carbohydrate food can be further processed into other food forms, or can be simply added into other form matrices, including confectionaries, baked goods, beverages, cereals, etc.

The protective Food Film Component comprises a structural polymer, the structural polymer comprising 1) a viscous, non-digestible, fermentable material, selected from the group consisting of i) gums and food thickeners, ii) an inulin, and iii) mixtures thereof, 2) a protein polymer, and 3) mixtures thereof. The reduced digestible carbohydrate food made in accordance with the present invention typically comprises, by weight, at least about 50%, more typically at least 75%, and even more typically at least about 85%, and up to about 98%, more typically up to about 90%, of a carbohydrate-based food ingredient, and typically at least about 2%, and more typically at least about 5%, and up to about 40%, more typically up to about 15%, and even more typically up to about 10%, of the non-digestible protective material.

Structural/Viscous Fermentable Material:

The viscous fermentable material, referred to hereinafter as a Structural/Viscous Fermentable Material (SVFM), typically has a rigid carbohydrate backbone, and typically comprises a variety of functional components, including many hydroxyl groups, a polyelectrolyte that possesses ionizable side chains that are either cationic or anionic in nature, and/or a non-ionic polymer. The hydrocolloids that are useful as Structural/Viscous Fermentable Material can be derived from marine plants, such as red seaweed and brown seaweed; land plants such as tree exudates, plants, seeds, tubers, and trees; microbial polysaccharides; and polysaccharide derivatives. The Structural/Viscous Fermentable Material can be characterized as a framework material of the Food Film Network. The hydrocolloids that are useful as a Structural/Viscous Fermentable Material can be selected from the group consisting of carrageenan, furcellaran, alginates, gum arabic, gum ghatti, gum tragacanth, karaya gum, guar gum, locust bean gum, tara gum, tamarind gum, inulin, agar, konjac mannan, arabinoxylans, β-glucans and xyloglucans, pectin, cellulose, curdlan, dextran, gellan gum, rhamsan gum, scleroglucan, welan gum, diutan gum, xanthan gum, gelatin, carboxymethylcellulose, hydroxypropyl cellulose, hydroxypropyl methyl cellulose, hydroxyethyl cellulose, propylene glycol alginate, hydroxypropyl guar, and modified starches.

Preferred hydrocolloids useful as a Structural/Viscous Fermentable Material can provide high levels of viscosity (greater than 300 cp according to the Viscosity Method, described hereinafter, modified for a 1% solution), are stable in gastric fluid, and provide optimum film properties, as described later. A preferred hydrocolloid useful as a Structural/Viscous Fermentable Material is selected from the group consisting of xanthan gum, the galactomannans (guar gum and locust bean gum), pectin, alginates, carrageenan, tragacanth gum, karaya gum, and inulin having a degree of polymerization (DP) from 2-60 fructose units (FU) and an average DP of 8-12 FU, and more preferably a DP from 15-60 FU and an average DP of about 15-30 FU. Xanthan gum provides excellent viscosity, and is synergistic with the galactomannans (guar gum and locust bean gum) to produce higher viscosities. Both xanthan gum and guar gum possess good film extensibility and coating properties. Pectin and the alginates have the ability to cross link to produce stronger films or coatings, particularly in combination with Ionic Property Modifiers, discussed below. The selection for use in a specific food system may vary based on the composition of the food in which they are to be used. The Structural/Viscous Fermentable Material can be used either individually or in mixtures with other Structural/Viscous Fermentable Materials, or with a structural protein polymer, described below.

Structural Protein Polymer

The structural protein polymer can be characterized as a framework material of the non-digestible Food Film Network. The protein polymer can be used alone as the Food Film Component, although typically it is used in combination with the Structural/Viscous Fermentable Material to provide synergistic film-forming benefits. The synergism provides the ability to modify and optimize film performance and characteristics, such as adjustments of the rheological properties or improvements in the strength of the protective food film. The protein polymer is typically partially or completely digestible, and can be selected from the group consisting of gluten, modified gluten, casein, soy, whey protein concentrate, chitin, chitosan, amylose, and mixtures thereof. Gluten can be provided as corn gluten or vital wheat gluten.

The non-digestible protective material comprised in the reduced digestible carbohydrate food can comprise, by weight, typically at least about 5%, more typically at least about 10%, more typically at least about 20%, and even more typically at least about 30%, and up to about 50%, more typically up to about 40%, and even more typically up to about 15%, of the structural and viscous food film component selected from at least one, and typically both, of the structural/viscous fermentable material and the structural protein polymer.

The Food Film Component also typically comprises a Rheology Modifier/Plasticizer, an Ionic Property Modifier, or, more typically, a mixture thereof.

Rheology Modifier/Plasticizer

The Food Film Component, and the Food Film Network formed therefrom, can so optionally, though preferably, comprise a Rheology Modifier material. The Rheology Modifier, also referred to herein as a plasticizer or film plasticizer, can improve the flow properties of the structural polymers of the Food Film Component by providing plasticity and flexure, extensibility, and humectancy, to produce a thin, strong, resilient film network that can be extensively distributed throughout the matrix of the reduced digestible carbohydrate food. One or a mixture of the plasticizers can be used with a structural polymer, or a mixture thereof. Typical plasticizers can include low molecular weight saccharides such as glycerin, fructose, fructooligosaccharides (also known as oligofructose) having a range of polymerization from about 2-5, with an average of about 4, or having a range of polymerization from about 2-8, with an average of about 4.7, polyols such as maltitol, maltitol syrups, isomalt, lactitol, erythritol, sorbitol, polydextrose, and xylitol, certain dietary fibers such as inulin, and typically inulin having a degree of polymerization (DP) from about 2-20, and an average DP of about 4-7, other oligosaccharides, gum arabic, and partially hydrolyzed guar gum (available commercially as Benefiber® from Novartis). The plasticizer can be added to single hydrocolloid or mixed hydrocolloid film systems. Changes in film rheology affect the flow and deformation characteristics of the film, thus modifying the protective food film's viscoelastic properties in order to enhance the extensibility (networking) and flow of the film in hard to access areas of the carbohydrate-based food structure, and to improve its barrier and digestion-resistance performance.

The non-digestible protective material comprised in the reduced digestible carbohydrate food can comprise, by weight of the non-digestible protective material, typically at least about 25%, more typically at least about 35%, and up to about 90%, and more typically up to about 70%, of the rheology modifier material.

Ionic Property Modifiers:

The Food Film Component, and the Food Film Network formed therefrom, can so optionally, though typically, comprise an Ionic Property Modifier. The Ionic Property Modifier is used to change the physical properties of certain of the Structural/Viscous Fermentable Materials, and of the resulting food film network, by modifying surface charges on and/or crosslinking the polymeric hydrocolloids in the system. The IPM is particularly useful with charged polymeric hydrocolloids such as a pectin or an alginate. The Ionic Property Modifier can be selected from a divalent cation, such as $Ca^{++}$ and $Mg^{++}$, a monovalent cation, such as $Na^+$, $K^+$, $Li^+$, or a mixture thereof. Inorganic salts are typical sources of the cations. Counterions can change the level of and distribution of ionic charge on a polymer, which can affect its water binding property and viscosity. The ionic property modifiers can be added constituents to a digestible carbohydrate-based ingredient, or can be provided by the digestible carbohydrate-based ingredient itself. Added electrolytes can interact with charges on the polyelectrolyte backbone or interfere with mobile counter ions that may be present. These interactions can change the character of the protective food film network, i.e. crosslinking of the backbone structures to create stronger films.

The non-digestible protective material comprised in the reduced digestible carbohydrate food can comprise, by weight of the non-digestible protective material, typically at least about 0.5%, more typically at least about 1%, more typically at least about 3%, and typically up to about 20%, more typically up to about 10%, and even more typically up to about 5%, by weight, of the ionic property modifier cation.

Levels and Combinations of Non-Digestible Food Film Components:

The usage level of food film components can vary based on the food application. The reduced digestible carbohydrate food typically comprises up to 50% by weight of the Non-Digestible Material, typically selected from a Structural/Viscous Fermentable Material, a Structural Protein Polymer, a Rheology Modifier, and a mixture thereof, and an optional Ionic Property Modifier. More typically, the reduced digestible carbohydrate food comprises up to 20% of the Structural/Viscous Fermentable Material, the Structural Protein Polymer, or a mixture thereof, up to 30% of the Rheology Modifier, and optionally up to 5% Ionic Property Modifier; and even more typically up to 5% of the Structural/Viscous Fermentable Material, the Structural Protein Polymer, or a mixture thereof, up to 15% of the Rheology Modifier, and optionally up to 5% Ionic Property Modifier. The typical levels and more typical levels of the non-digestible food film materials in the resulting reduced digestible carbohydrate food are shown in Table B.

TABLE B

| Non-Digestible Material type | Typical level, % by weight of reduced digestible carbohydrate food | More typical level, % by weight of reduced digestible carbohydrate food |
|---|---|---|
| Structural/Viscous Fermentable Material | about 0.2 to about 20 | about 0.5 to about 5 |
| Structural Protein Polymer | about 0.2 to about 30 | about 5 to about 15 |
| Rheology Modifier/Plasticizer | about 0.2 to about 20 | about 3 to about 10 |
| Ionic Property Modifier | about 0.01 to about 2 | about 0.05 to about 0.3 |

Generally, the level of use of the non-digestible food film materials (weight of non-digestible food film materials as a percent of the total weight of resulting food) is a variable that can affect the primary result of the invention: the blood glucose level, which relates to the extent to which digestible carbohydrates in the food will pass through the small intestine without being digested or absorbed. Generally, a desired glucose response will usually dictate the level of non-digestible food film materials.

The hydrocolloid components of the present invention can be formulated into varying ratios and combinations to meet the functional, processing, organoleptic, and digestion-reducing requirements of a particular food system. Typical examples of hydrocolloid components useful for forming non-digestible Food Film Networks and for providing viscous intestinal chyme include, but are not limited to, those shown in Tables C and D.

TABLE C

| | Formula No. | | | | | | | | | |
|---|---|---|---|---|---|---|---|---|---|---|
| | I | II | III | IV | V | VI | VII | VIII | IX | X |
| Structural and Viscous Food Film Components | | | | | | | | | | |
| Structural/Viscous Fermentable Material | | | | | | | | | | |
| Xanthan gum | 11.5 | 11.6 | 13.2 | 21.0 | 5.9 | | | | | |
| Guar gum | | 11.6 | | | | 4.4 | 14.7 | 4.0 | | 11.1 |
| Locust bean gum | | | | | | | | | | |
| HM pectin | 3.5 | 3.5 | 3.9 | 3.1 | 4.7 | | | | | |
| LM pectin | | | | | | | | | | |
| k-carrageenan | | 5.8 | 6.6 | | 8.2 | | | | | |
| Alginate | | | | | | | | | | |
| Gellan gum | | | | | | | | | | |
| High amylose starch | | | | | | | 40.2 | | | |
| Methylcellulose | | | | | | | | | | |

TABLE C-continued

| Structural Protein Polymers | | | | | | | | | | |
|---|---|---|---|---|---|---|---|---|---|---|
| Wheat fiber | | | | | | | | | | |
| Vital wheat gluten | 10.5 | | | 9.4 | | 19.7 | 46.1 | 50.8 | 50.0 | 50.0 |
| Modified wheat gluten | 7.0 | | | 6.2 | | | | | | |
| Long chain Inulin | | | | | | | | | | |
| % Structural/Viscosity. | 32.5 | 32.5 | 23.7 | 39.7 | 18.8 | 64.3 | 60.8 | 54.8 | 50.0 | 61.1 |
| Rheology Modifier/Plasticizer | | | | | | | | | | |
| Short chain inulin | | | | | 35.5 | | | | | |
| Fructose corn syrup (42 DE) | | | | | | | | | | |
| Polydextrose | | | | | | | | | | |
| Polydispersed inulin | 35.0 | 35.0 | 39.5 | 31.2 | | 35.7 | 39.2 | 45.2 | 50.0 | 38.9 |
| Sorbitol | 29.0 | 29.0 | 32.9 | 26.0 | 41.0 | | | | | |
| Glycerin | | | | | | | | | | |
| % Plasticizer | 64.0 | 64.0 | 72.4 | 57.2 | 76.5 | 35.7 | 39.2 | 45.2 | 50.0 | 38.9 |
| Ionic Property Modifier | | | | | | | | | | |
| Potassium chloride | 3.5 | 3.5 | 3.9 | 3.1 | 4.7 | | | | | |
| Calcium chloride | | | | | | | | | | |
| Sodium citrate | | | | | | | | | | |
| % Ionic Property modifier Total | 3.5 | 3.5 | 3.9 | 3.1 | 4.7 | 0.0 | 0.0 | 0.0 | 0.0 | 0.0 |
| Total Non-Digestible Material | 100.0 | 100.0 | 100.0 | 100.0 | 100.0 | 100.0 | 100.0 | 100.0 | 100.0 | 100.0 |

| | Formula No. | | | | | | | | | |
|---|---|---|---|---|---|---|---|---|---|---|
| | XI | XII | XIII | XIV | XV | XVI | XVII | XVIII | XIX | XX |
| Structural and Viscous Food Film Components | | | | | | | | | | |
| Structural/Viscous Fermentable Material | | | | | | | | | | |
| Xanthan gum | | | | 24.0 | | | | 11.8 | 10.5 | 10.5 |
| Guar gum | 16.7 | 22.2 | 24.0 | | | | 11.8 | | | |
| Locust bean gum | | | | | | | | | 8.0 | |
| HM pectin | | | | | | | | | | |
| LM pectin | | | | | | | | | | 3.2 |
| k-carrageenan | | | | | | | | | | |
| Alginate | | | | | 8.4 | 10.9 | | | | |
| Gellan gum | | | | | | | | | | 5.3 |
| High amylose starch | | | | | | | | | | |
| Methylcellulose | | | | | | | | | | |
| Structural Protein Polymers | | | | | | | | | | |
| Wheat fiber | | | | | | | | | | |
| Vital wheat gluten | 33.3 | | 10.4 | 10.4 | 10.8 | 9.8 | 10.6 | 10.6 | 10.5 | 9.4 |
| Modified wheat gluten | | | 5.6 | 5.6 | 5.8 | 6.5 | 7.0 | 7.0 | 6.0 | 6.3 |
| Long chain Inulin | | | | | | | | | | |
| % Structural/Viscosity. | 50.0 | 22.2 | 40.0 | 40.0 | 25.0 | 27.2 | 29.4 | 29.4 | 35.0 | 34.7 |
| Rheology Modifier/Plasticizer | | | | | | | | | | |
| Short chain inulin | | | | | | | | | | |
| Fructose corn syrup (42 DE) | | | | | | | | | | |
| Polydextrose | | | | | | | | | | |
| Polydispersed inulin | 50.0 | 77.8 | 60.0 | 60.0 | 62.2 | 32.6 | 47.1 | 47.1 | 45.2 | 31.6 |
| Sorbitol | | | | | | 27.2 | 23.5 | 23.5 | 19.8 | 26.3 |
| Glycerin | | | | | | | | | | |
| % Plasticizer | 50.0 | 77.8 | 60.0 | 60.0 | 62.2 | 59.8 | 70.6 | 70.6 | 65.0 | 57.9 |
| Ionic Property Modifier | | | | | | | | | | |
| Potassium chloride | | | | | | | | | | 2.1 |
| Calcium chloride | | | | | 6.2 | 5.4 | | | | 5.3 |
| Sodium citrate | | | | | 6.6 | 7.6 | | | | |
| % Ionic Property modifier Total | 0.0 | 0.0 | 0.0 | 0.0 | 12.8 | 13.0 | 0.0 | 0.0 | 0.0 | 7.4 |
| Total Non-Digestible Material | 100.0 | 100.0 | 100.0 | 100.0 | 100.0 | 100.0 | 100.0 | 100.0 | 100.0 | 100.0 |

TABLE D

| | \multicolumn{10}{c}{Formula No.} | | | | | | | | | |
|---|---|---|---|---|---|---|---|---|---|---|
| | XXI | XXII | XXIII | XXIV | XXV | XXVI | XXVII | XXVIII | XXIX | XXX |
| \multicolumn{11}{c}{Structural and Viscous Food Film Components} |
| \multicolumn{11}{c}{Structural/Viscous Fermentable Material} |
| Xanthan gum | 24.0 | | 10.4 | | | 5.0 | | | | |
| Guar gum | | | | 13.5 | 11.1 | | 12.1 | 7.7 | 2.3 | 4.3 |
| Locust bean gum | | 5.2 | | | | | | | | |
| HM pectin | | | 3.1 | | | | 6.8 | | | |
| LM pectin | 2.4 | | | | | | | | | |
| k-carrageenan | | 4.8 | | | | 9.7 | | | 8.1 | 6.5 |
| Alginate | | | | 4.0 | | | | | | |
| Gellan gum | 6.4 | | | | | | | | | |
| High amylose starch | | | | | | | | 25.5 | 19.9 | 3.0 |
| Methylcellulose | | | | | | | | | 11.6 | 8.1 |
| \multicolumn{11}{c}{Structural Protein Polymers} |
| Wheat fiber | | | 10.4 | | 5.6 | | 7.7 | | 11.6 | 16.1 |
| Vital wheat gluten | 10.4 | 11.9 | 9.4 | 3.1 | | 7.8 | 9.6 | | | 7.2 |
| Modified wheat gluten | 5.6 | 7.5 | 6.2 | 2.7 | | 6.5 | 7.1 | | | 4.8 |
| Long chain Inulin | | | | | | | | | | |
| % Structural/Viscosity. | 48.8 | 29.4 | 39.5 | 23.3 | 16.7 | 29.0 | 43.3 | 33.2 | 53.5 | 50.0 |
| \multicolumn{11}{c}{Rheology Modifier/Plasticizer} |
| Short chain inulin | | | | | 44.4 | 37.9 | 35.5 | 36.0 | | |
| Fructose corn syrup (42 DE) | | | | | | | | | | |
| Polydextrose | | | | | | | | | | |
| Polydispersed inulin | 27.0 | 37.2 | 31.4 | 36.5 | | | 18.4 | | 34.6 | 32.2 |
| Sorbitol | 14.4 | 28.0 | 26.0 | 24.3 | 38.9 | 26.7 | | 30.8 | 5.8 | 8.0 |
| Glycerin | | | | | | | | | | |
| % Plasticizer | 41.4 | 65.2 | 57.4 | 60.8 | 83.3 | 64.6 | 53.9 | 66.8 | 40.4 | 40.2 |
| \multicolumn{11}{c}{Ionic Property Modifier} |
| Potassium chloride | 4.8 | | 3.1 | 2.7 | | | 2.8 | | 2.8 | 4.7 |
| Calcium chloride | 5.0 | | | 6.7 | | 6.4 | | | 3.3 | 5.1 |
| Sodium citrate | | 5.4 | | 6.5 | | | | | | |
| % Ionic Property modifier | 9.8 | 5.4 | 3.1 | 15.9 | 0.0 | 6.4 | 2.8 | 0.0 | 6.1 | 9.8 |
| Total | | | | | | | | | | |
| Total Non-Digestible Material | 100.0 | 100.0 | 100.0 | 100.0 | 100.0 | 100.0 | 100.0 | 100.0 | 100.0 | 100.0 |

| | \multicolumn{10}{c}{Formula No.} | | | | | | | | | |
|---|---|---|---|---|---|---|---|---|---|---|
| | XXXI | XXXII | XXXIII | XXXIV | XXXV | XXXVI | XXXVII | XXXVIII | XXXIX | XXXX |
| \multicolumn{11}{c}{Structural and Viscous Food Film Components} |
| \multicolumn{11}{c}{Structural/Viscous Fermentable Material} |
| Xanthan gum | 8.9 | | | | | | | | | |
| Guar gum | | 5.5 | | | | | 16.0 | | 5.0 | 3.7 |
| Locust bean gum | | | | 4.7 | 5.0 | 3.8 | | 5.4 | | |
| HM pectin | | | 11.9 | | | | | | 1.5 | 4.7 |
| LM pectin | | | | | | | | | | |
| k-carrageenan | 10.5 | 5.9 | 15.5 | 7.1 | 5.0 | 7.7 | 9.1 | 6.4 | 7.5 | 8.2 |
| Alginate | | | | | | | | | | |
| Gellan gum | | | | 1.4 | 2.0 | 1.4 | 4.5 | 2.1 | | |
| High amylose starch | | | | | | | | | | |
| Methylcellulose | 1.2 | 10.2 | 6.5 | | | | | | | |
| \multicolumn{11}{c}{Structural Protein Polymers} |
| Wheat fiber | 15.2 | | | | | | | | | |
| Vital wheat gluten | 9.4 | 10.2 | | | | | | | | |
| Modified wheat gluten | 9.1 | 8.5 | | | | | | | | |
| Long chain Inulin | 5.0 | 7.2 | 9.1 | | | | | | | |
| % Structural/Viscosity. | 59.3 | 47.5 | 43.0 | 13.2 | 12.0 | 12.9 | 29.6 | 13.9 | 14.0 | 16.6 |
| \multicolumn{11}{c}{Rheology Modifier/Plasticizer} |
| Short chain inulin | 27.0 | | 31.4 | | | | | 64.5 | 39.8 | 39.1 |
| Fructose corn syrup (42 DE) | | | | 37.6 | | | | | 44.7 | 39.6 |
| Polydextrose | | | | | 67.0 | 28.6 | | | | |
| Polydispersed inulin | | 35.8 | 10.4 | | | | | | | |
| Sorbitol | 8.8 | 10.2 | | 23.8 | 20.0 | 28.5 | | 20.6 | | |
| Glycerin | | | 5.5 | 21.5 | | 28.6 | 68.3 | | | |
| % Plasticizer | 35.8 | 46.0 | 47.3 | 82.9 | 87.0 | 85.7 | 68.3 | 85.1 | 84.5 | 78.7 |
| \multicolumn{11}{c}{Ionic Property Modifier} |
| Potassium chloride | | | | 1.4 | 0.5 | | | 0.5 | 1.5 | 4.7 |
| Calcium chloride | 4.9 | 6.5 | 9.7 | | | | | | | |

TABLE D-continued

| | | | | | | | | | | |
|---|---|---|---|---|---|---|---|---|---|---|
| Sodium citrate | | | | 2.5 | 0.5 | 1.4 | 2.1 | 0.5 | | |
| % Ionic Property modifier Total | 4.9 | 6.5 | 9.7 | 3.9 | 1.0 | 1.4 | 2.1 | 1.0 | 1.5 | 4.7 |
| Total Non-Digestible Material | 100.0 | 100.0 | 100.0 | 100.0 | 100.0 | 100.0 | 100.0 | 100.0 | 100.0 | 100.0 |

Film component combinations are developed for a specific application to achieve desired film properties and performance. A film that works in one food may not work as well in another food. Variables such as the required degree of cross-linking, chemical interactions, degree of hydrogen bonding, water binding, the presence and strength of ionic species and effects of the food matrix on film rheology will influence the selection and levels of specific film components.

Protective Food Film Network Properties:

Important properties of a protective food film network and its component materials include: 1) non-digestibility when exposed to the gastrointestinal enzymes of the stomach and small intestine, 2) acid stability, 3) thin, continuous films, 4) thickening or viscosity increase of the chyme, 5) coatability and cohesiveness to the digestible carbohydrate component, 6) resilient and extensible films, 7) optimum flowability under desired processing conditions, and 8) degradable by fermentation in the colon.

1) Non-Digestibility:

The hydrocolloids that are useful as non-digestible food film materials herein can be classified as non-digestible polysaccharides and non-digestible oligosaccharides, and are considered to be dietary fibers by their physiological or physical-chemical properties. Dietary fibers are non-digestible by present definition in that they are resistant to digestion and absorption in the human small intestine. The non-digestibility of the food film network ensures that an effectively coated or segregated cell or particle of protected carbohydrate will pass through the stomach and small intestine, without being digested itself to any significant extent by these or other enzymes in the gastrointestinal tract. Any digestion of the food film network could expose the cells or particles of digestible carbohydrate to digestion by the enzymes into sugars that could then be absorbed in the small intestine. The non-digestibility of the food film network causes the digestible carbohydrate-based ingredient to become fiber-like; that is, the protected carbohydrate takes on the properties of a resistant starch of type RS1 that is by present definition a dietary fiber.

2) Acid Stability:

Acid stability of the food film network also helps to maintain its integrity in the acidic environment of the stomach, thereby reducing the possibility for degradation of the protective film systems that would result in exposing digestible carbohydrate to digestion and then absorption in the small intestine. Loss of film integrity would in addition mean a reduction in potential healthful effects resulting from a reduction in the delivery of protected digestible carbohydrate to the colon. The hydrocolloids of the present invention are selected as having acceptable acid stability. However, since it is possible that acid stability of a hydrocolloid can change when combinations of hydrocolloids are used, it is recommended to test the acid stability of the food film network using a gastric juice or its synthetic equivalent. Acid stability relates to the film network's ability to maintain the microstructure of the protected carbohydrate-base food, whereby the protected carbohydrate-base food maintains its low level of measured digested carbohydrate. By example, a cooked pasta made according to the present invention can be placed in a glass reaction vessel and completely covered by 0.10 M HCl (typical of stomach acid concentration) and allowed to stir on a stir pad for 1 hour at 36° C. Following the holding time, the pasta is removed and washed thoroughly with deionized water with the aid of a plastic pasta strainer, so that the resultant wash water off the pasta has a pH equal to the wash being used. Pasta can then be analyzed in vivo using the Blood Glucose Response method (later described).

3) Thin, Continuous Films:

Thin, continuous hydrocolloid films that are produced within the food film network promote the distribution of the film system throughout the resulting reduced digestible carbohydrate food at relatively lower usage levels by weight, resulting in a more effective and efficient blood sugar control system. Effectively thin and continuous film networks minimize the dilution amount of the hydrocolloid, and maximizes the carbohydrate digestion resistance of the film network.

4) Thickening or Viscosity Increase of the Chyme:

Some embodiments of the food film network and its component hydrocolloids can provide a retarding of the diffusion and transfer of absorbable sugar products of carbohydrate digestion through the chyme and to the wall of the small intestine where the sugars can be absorbed into the blood stream. The hydrocolloid-induced viscosity of the resulting chyme can play an important role in reducing or slowing postprandial blood glucose levels.

The viscosity of a liquid is a measurable property that describes its internal resistance to flow and is a measure of a fluids flowability at a specific temperature Hydrocolloids can induce increased viscosity when hydrated. Optimum hydration is achieved when the hydrocolloid is highly dispersed or solubilized in an aqueous system. Consequently, hydrocolloid material having small particle size in the range of 50 to 100 microns can be important to achieving good hydration of the hydrocolloid. Hydration of the hydrocolloid material can be facilitated when using high-shear mixing techniques in the preparation of in situ film networks.

Hydrocolloids can dramatically affect the flow behavior of many times their own weight of water. Hydrocolloids that are polyelectrolytes can effect higher viscosities than non-ionic polymers of similar molecular mass. This can be attributed to charge repulsion as well as molecular size and structural characteristics that are enhanced by hydration. Viscosity generally changes with hydrocolloid concentration, temperature and shear strain. Hydrocolloid mixtures can act synergistically to increase viscosity or antagonistically to reduce viscosity. Inulin is an effective antagonist. The addition of electrolyte or a pH adjustment can reduce the dissociation of charged groups on certain hydrocolloid, normally leading to the collapse of polymer coils resulting in a corresponding decrease in viscosity.

5) Coatability and Cohesiveness to the Digestible Carbohydrate Component:

The present invention provides a food film having effective film coating and adhesive properties, to provide coverage with the film while providing required film adherence. A strong binding of the surface of the film to that of the carbohydrate-based food ingredient particles is preferred for creating a barrier that protects the food against contact with the acid and enzymes of the gastrointestinal tract. Components of each food film are individually distinct, though combinations of these can provide unique performance. The coating ability of a specific film system can often best be determined by determining the carbohydrate digestion resistance of the resulting reduced digestible carbohydrate food.

6) Resilient and Extensible Films:

The food film networks are formed from viscoelastic food film components that are both resilient and extensible. Viscoelastic refers to having both viscous and elastic film properties. The combined properties of viscosity and elasticity (defined as elongation to break in the food film properties section) as well as strength (defined as breaking strength in the food film properties section) and resilience, are important properties for films of the invention. The films need to be sufficiently elastic and extensible to avoid fracture and breakage. The opposite of elastic is brittle. Brittle films (defined as having low elongation to break values) will break or fracture, and can loose their ability to protect the available digestible carbohydrates from digestion. Elastic films will resist breaking and have the ability to provide film integrity. Elastic films often have better flow characteristics thus having the ability to provide good coverage of the food including reaching small areas like cracks and fissures. Resilient films will also resist breakage by tearing of the film. Analytical methods can evaluate relative strengths, flowability, viscosity and elasticity of resultant films, as defined in the food film property section.

7) Optimum Flowability Under Desired Processing Conditions:

Food films having good flow properties, measured as lower viscosity of a hydrated fluid film, can provide better coverage throughout the entire particulate composition of the carbohydrate-based ingredient that is being processed. In addition to the components of the food film, processing temperatures, pH and food constituents can affect the flowability of the film when it is being coated onto and among the carbohydrate-based ingredient particles. For this reason, the temperature during the coating process is important to get optimum coating, and the changes in flowability can be profiled analytically, as defined by methods defined in the food film property sections.

8) Degradation in the Colon:

Finally, the protective food film material that passes through the small intestines should be releasable for use in the colon, through, for example, degradation by fermentation, change in pH, bacterial digestion, or a combination of these.

Food Film Properties:

The viscoelastic properties of the non-digestible food film compositions can be measured and evaluated to show how various components of the film influence the brittleness or elasticity, and viscous effects of the food film compositions. Further, its ability to flow or its viscosity profile, should also be measured accurately. Synergies of various structural hydrocolloids and plasticizers are important for the development of film compositions that have excellent viscosity control for even flow, and have improved elasticity or flexibility properties to minimize brittleness and fracture of the food film.

It is known that a hydrated film can be made by hydrating individual or blends of non-digestible materials with excess water, heat, and shear, resulting in a fluid system. The water content of the hydrate food film system typically is from 75% to 85% by weight. Once produced, the flowability of the hydrated food film system can be determined by measuring its resistance to flow (viscosity) under selected temperatures, in accordance with the Viscosity Measurement method described in the Methods section.

The hydrated films can then be dried to determine the dried film's physical qualities using a standard texture analyzer. These analyzers and techniques for their use are well known to persons skill in the art of textural analysis. The physical qualities can include the resulting dried film's parameters including firmness, relaxation, swelling, adhesiveness/stickiness, tack, tackiness, resilience, springiness, cohesiveness, and extensibility.

A hydrated food film composition is made according to the method "Preparation of a Hydrated Food Film Composition", disclosed in the Methods Section. The hydrated food film composition is made into a dried, stabilized food film sample in accordance with the method "Preparation and Testing of Dried, Stabilized Food Film Samples", also disclosed in the Methods Section. The dried, stabilized food film samples can then be tested to determine the food films physical properties in accordance with the physical property evaluations as follows.

An indication of the film quality is obtained by evaluating the modulus of a sample of the material. The modulus can be defined as the resistance of the food film to deformation, i.e. to mean the amount of stress applied to create a designated amount of strain (elongation). The defining elements of these stresses are the storage modulus (or E') and the loss modulus (or E").

The storage modulus is the stress that is in phase with the strain in a sinusoidal deformation, divided by the strain, while the E" or loss modulus defines the stress that is 90° out of phase with the strain, divided by the strain. The E' is a measure of the amount of stored energy and recovered per deformation cycle. It involves the reversibility of the deformation or defines the elastic character of the film. The value E' is also referred to herein as the breaking strength of the film, expressed in dynes/cm$^2$. It is calculated by software in the food texture analyzer. It is a measure of the resistance to force by the film that has been exerted by the piston of the analyzer over a fixed distance. The E" is a measure of the film's energy dissipated or lost as heat per deformation cycle. It is a measure of the film's irreversibility or defines a film's viscous characteristic that is contributed by the film's high water-binding food film components. A principle measurement of a film's mechanical quality is its elongation to break, expressed as a percentage of deformation from rest to film breakage. Another measure of film mechanical quality is its breaking or tensile strength, i.e. the amount of stress expressed in dynes/cm$^2$ that is applied to deform a film to its breaking or failure point.

Food film systems made without plasticizers and composed of high molecular weight polymers, such as pectins, have relatively high modulus values. However, they have low elongation to break, and are quite brittle, having low breaking strength values. Thus a single entity food film of this type can easily fracture and fail. However, films made with increasing levels of plasticizers typically have higher elongation to break, decreasing E' and E" values, and exhibit less overall brittleness and tenacity, with higher overall breaking strength values.

Increasing levels of viscosity-generating polymers, like starch and pectin (particularly those having lower degrees of methylation, and thus also lower molecular weight), typically result in gradual decrease in both storage modulus, or breaking strength (E') and loss modulus (E"). Plasticizers, such as inulin, glycerin, and sorbitol, can be used to facilitate polymer hydration and thus have influence on the film modulus.

By example, a food film consisting of only high methoxyl (HM) pectin (>65% methyl esterification) or those produced with small amounts of other hydrocolloid polymers, like starch, exhibit high modulus values in the range of 3E+10 to 5E+10 dynes/cm$^2$. These films have elongation to break between 5 and 30%, typifying relatively brittle films. By example, films made of 95% HM pectin and 5% corn starch (70% amylose and 30% amylopectin) had E' values ranging from 3E+10 to 2.5E+10 dynes/cm$^2$ at 20° C. to 200° C., respectively. Loss modulus (E") values under similar conditions for the HM pectin film range from 4E+09 to 3E+09 dynes/cm$^2$ at 20° C. to 200° C., respectively. Glycerin added as a plasticizer to a 95% HM pectin/5% starch film at 9% of film, results in E' values of 2.5E+10 at 20° C. and about 1E+09 at 200° C.; significantly lower than films without plasticizer.

In a further example of plasticizer influence, 20% glycerin added to a 95/5 (65% HM) pectin/70% amylose starch film resulted in E' values of 2E+10 at 20° C. and 3E+08 at 200° C. Brittleness of films was apparent without plasticizer use. Increasing plasticizer levels decreases both E' and E" over the temperature range, as compared to unplasticized pectin-based films. At room temperature, E' and E" values were approximately 50%. At higher temperature levels, fluidity as measured by E' and E" decreased more than an order of magnitude.

Dried hydrated food film mixtures for the purpose of the invention typically form dried, stabilized samples having high breaking strengths and elongation to break, to demonstrate good flexibility and structural strength. Dried, stabilized samples of a food film material of the present invention typically has a breaking strength of at least about 5 dynes/cm$^2$ and an elongation to break of at least about 10%; more typically has a breaking strength of at least about 150 dynes/cm$^2$, more typically at least about 10,000 dynes/cm$^2$, and even more typically at least about 1 E+7 dynes/cm$^2$, and an elongation to break of at least about 100%, more typically at least about 200%; a breaking strength of up to about 5E+11 dynes/cm$^2$ and elongation to break of up to about 500%; and typically has a breaking strength in the range of about 1E+6 to about 1E+09 dynes/cm$^2$, more typically in the range of about 1E+8 to about 4E+08 dynes/cm$^2$, and an elongation to break in the range between about 200-400%, more typically in the range between about 250-300%.

Viscosity of the hydrated food film system is also important to the functional properties of the invention. The hydrated food film compositions typically have viscosity profiles, at a 10% concentration by weight in water, of about 500 cP at 20° C., more typically 1000 cP at 20° C., still more typically 5000 cP at 20° C., and can be as high as 100,000 centipose (cP) at 20° C., but more typically between about 2500 and 10,000 cP. The viscosity of the hydrated food film compositions is determined in accordance with the Viscosity Measurement method described later. The hydrated food film compositions can be made according to the method "Preparation of a Hydrated Food Film Composition", where the water concentration is 90% by weight and the hydrocolloid material is 10% by weight.

By example, food film compositions containing a single hydrocolloid entity, such as only inulin or only pectin, have either low viscosity profiles in the case of inulin (where the inulin is serving as a plasticizer) or high viscosity profiles in the case of pectin. Neither composition results in high elongation to break, defined as breaking strength or tensile strength. As a further example, a composition containing 88% water and 12% inulin has a low viscosity of approximately 3 cP at 20° C. and a relatively low breaking strength value of approximately 4.8E+03 dynes/cm$^2$. As a further example, a composition containing 85% water and 15% high methoxyl pectin has a significantly higher viscosity of approximately 3,000 cP at 20° C., but a very low breaking strength of approximately 5 dynes/cm$^2$. By combining various high water binding hydrocolloids (the structural/viscous fermentable material) with one or more plasticizers (the rheology modifier), both viscosity control and flexibility of the food film can be achieved.

By example, a hydrated food film composition consisting by weight of 1.2% xanthan gum, 1.0% kappa carrageenan, 0.6% HM-pectin, 12% polydispersed inulin, 4% sorbitol, 0.2% potassium chloride, and 81% water, has a viscosity of approximately 3000 cP at 20° C., and a breaking strength value of approximately 5.25E+05 dynes/cm$^2$.

In a further example, a hydrated food film composition of the present invention consisting by weight of 0.4% gellan gum, 1.2% kappa carrageenan, 1.0% guar gum, 12% short chain inulin, 3.8% sorbitol, 0.1% sodium citrate, 0.1% potassium chloride, and 81.4% water, has a viscosity of approximately 6500 cP and breaking strength of approximately 7.2E+05 dynes/cm$^2$.

Viscosity-Building Component:

The second means of blocking the action of carbohydrate-digesting enzymes to digest available digestible carbohydrates in the digestion system, and to reduce the absorption of simple sugars in the small intestine, is to provide a viscosity-building component within the reduced digestible carbohydrate food. Another embodiment of the present invention can include a reduced digestible carbohydrate food containing a viscosity-building component. The viscosity-building component typically comprises a highly-viscosifying hydrocolloid, referred to as a Viscosifying Film Builder. The Viscosifying Film Builder contained in the reduced digestible carbohydrate food can be released directly into the chyme during the digestive process from the consumed food, or can react from the surface of the reduced digestible carbohydrate food to increase the viscosity of the chyme. The Viscosifying Film Builder contributes a slippery, slimy, or greasy consistency to the chyme. (A contributor to the increase in viscosity can also come from the structure of a protective food film network, discussed above, which contributes to a "plug flow" type movement of the chyme along the intestine, as opposed to an intermixing-type movement.) The present invention also relates to a use of compositions comprising a non-digestible hydrocolloid that provides a viscosity-building component to a food, which builds viscosity in the chyme to reduce the digestion of available digestible carbohydrates and the absorption of the digestive product (simple sugars) of digestible carbohydrates into the blood stream.

The increase in viscosity is maintained as the chyme traverses the small intestine. The increase in viscosity and the slimy consistency can have two effects on the digestion of digestible carbohydrate material in the chyme, which are primarily responsible for reducing or slowing the formation of postprandial blood glucose levels of a digested carbohydrate material in a resulting reduced digestible carbohydrate food.

First, the increased viscosity and slimy consistency is believed to be responsible for decreased gastrointestinal (GI) transit time. The peristalsis action in the small intestine provides energy in the form of muscular contractive forces that both mix the chyme and move the chyme along the intestinal tract. Without being bound by any particular theory, it is believed that the increased viscosity provides resistance to intermixing of the chyme, which directs more of the peristalsis energy toward moving the chyme along the intestinal tract. The slippery, slimy consistency of the chyme also reduces the drag and adherence of the chyme to the intestinal wall. These actions decrease the transit time of the chyme in the small intestines.

Second, the increased viscosity can retard transportation of absorbable sugars (extrinsic and intrinsic sugars, and sugars resulting from the digestion of digestible carbohydrates) through the chyme to the wall of the small intestine where they would be absorbed into the blood stream. Increased viscosity reduces the peristaltic mixing that would stir the chyme within the intestine to transport the absorbable sugars to the intestinal wall, and also reduces the diffusion of sugar molecules within the chyme, where they can be absorbed into the blood stream.

As a result of the use of a Viscosifying Film Builder in a food containing a digestible carbohydrate, the digestible carbohydrate is protected from digestion and absorption in the small intestine, and postprandial glycemic response following consumption of the food can be attenuated.

Many of the Structural/Viscosifying Fermentable Materials described above can be also used as a Viscosifying Film Builder. The Viscosifying Film Builder generally comprises a non-digestible, fermentable fiber material, which can include gums and resistant starches. Typical hydrocolloids for use as a Viscosifying Film Builder can be selected from the group consisting of agar, carrageenan, furcellaran, alginates, gum arabic, gum ghatti, gum tragacanth, karaya gum, guar gum, locust bean gum, inulin, tara gum, tamarind gum, konjac mannan, arabinoxylans, b-glucans and xyloglucans, pectin, cellulose or cellulosic material, curdlan, dextran, gellan gum, rhamsan gum, scleroglucan, welan gum, xanthan gum, gelatin, carboxymethylcellulose, hydroxypropyl cellulose, hydroxypropyl methyl cellulose, hydroxyethyl cellulose, propylene glycol alginate, hydroxypropyl guar, and modified starches.

Preferred hydrocolloids useful as a Viscosifying Film Builder can provide high levels of viscosity (greater than 300 cp in a 1% solution, according to the Viscosity Method, described hereinafter), are stable in gastric fluid, and provide optimum film properties. A preferred hydrocolloid useful as a Viscosifying Film Builder is selected from the group consisting of xanthan gum, the galactomannans (guar gum and locust bean gum), pectin, alginates, carrageenan, tragacanth gum, and karaya gum. Xanthan gum provides excellent viscosity, and is synergistic with the galactomannans (guar gum and locust bean gum) to produce higher viscosities. Both xanthan gum and guar gum possess good film extensibility and coating properties. Low methoxy pectin and the alginates have the ability to cross link to produce stronger films or coatings. Inulin is a preferred Viscosifying Film Builder, and typically has a DP from 2-60 fructose units (FU) and an average DP of 8-12, and more preferably a DP from 15-60 FU and an average DP of about 15-30 FU.

The selection for use in a specific food system may vary based on the composition of the food in which they are to be used. The Structural/Viscosifying Film Builder can also be selected to interact and react synergistically with intrinsic hydrocolloids that are already present in the digestible carbohydrate-based ingredient.

The Viscosity Building Component can also comprise a Rheology Modifier or plasticizer, as identified above, to improve the flow properties of the Viscosifying Film Builder, which helps to distribute the Viscosifying Film Builder more uniformly throughout the resulting reduced digestible carbohydrate food or the masticated mass formed therefrom. One or a mixture of the Rheology Modifiers can be used with one or more Viscosifying Film Builders.

Typical plasticizers can include low molecular weight saccharides, such as glycerin and fructose, polyols such as sorbitol, xylitol, polydextrose, and certain dietary fibers such as inulin, and preferably inulin having a degree of polymerization (DP) from 2-20, and an average DP of 4-7, and fructooligosaccharides (also known as oligofructose) having a range of polymerization from 2-5, and an average of 4 or a range from 2-8, with an average of 4.7. The plasticizers can function as a humectant to facilitate the attraction, movement and distribution of moisture within the processed food matrix. The plasticizer can be added to single hydrocolloid or mixed Viscosity Building Component system.

A digestible or partially digestible plasticizer material can also be used, although typically at limited levels to minimize the glycemic load contribution.

The Viscosity Building Component can provide a reduced digestible carbohydrate food or a food additive that, when consumed on, in or with a second food containing available digestible carbohydrates, can reduce the glycemic response of the second food, by providing protection to the available carbohydrates from digestion, and by reducing the absorption of simple sugars produced by digested carbohydrate in the small intestine. The invention provides for the blunting of blood glucose response of a meal when the meal comprises at least one reduced digestible carbohydrate food product of the invention. When a reduced digestible carbohydrate food or food ingredient of the invention, preferable a portion commensurate with a recommended serving size of the food, is mixed with other foods in a meal, the blood glucose response of the meal will be blunted when compared to a meal in which all foods are conventional foods.

Colonic Effects and Benefit:

The second means for reducing the glycemic response of a food containing digestible carbohydrates provides for reducing the formation of glucose and the stimulation of glycogen in the liver through fermentation in the colon of the undigested, fermentable carbohydrate that by-passes the small intestine. Through this fermentation, additional health benefits, other than the reduction in glyemia can be realized.

In effect, the reduced digestible carbohydrate food made by practicing the present invention causes a controlled amount of protected digestible carbohydrate to by-pass the small intestine, resulting in its use by resident microorganisms in the colon. The undigested, protected carbohydrate that reaches the colon can be fermented by (can become food for) colon microflora that are normally present. These undigested, protected carbohydrates play a significant role in the health of the colon and the human body by maintaining the local health of the colon, as the large intestine plays a role in managing and conserving water and electrolytes to prevent dehydration. Additionally, a healthy colon aids the digestion of residual material passing from the small intestine, and provides a route for residual, undigestible material and toxins to pass. The large intestine is the most heavily colonized region of the digestive tract, with up to $10^{11}$-$10^{12}$ anaerobic bacteria for every gram of intestinal content. These bacteria produce enzymes that further the digestion of proteins and carbohydrates passing undigested from the small intestine. Many variables can influence the extent of the undigestible carbohydrate fermentation and consequently, the nature and amount of the various end products produced from the fermentation, including gases (methane, hydrogen, carbon dioxide) short chain fatty acids (SCFA) (C2-C5 organic acids), as well as an increased bacterial mass. The extent of fermentation typically range from completely fermented (many water-soluble undigestible carbohydrates, as those created by practicing the present invention) to little fermentation, e.g.

cellulose particles. However, of the many factors influencing the extent of fermentation, the primary influence is the physicochemical nature of the undigestible carbohydrate.

Increases in microbial mass from undigestible carbohydrate fermentation contributes directly to stool bulk, which is a large part of the stool weight. Bacteria are about 80% water and have the ability to resist dehydration, as such contribute to water-holding in fecal material. The number of bacteria in human feces is approximately $4\times10^{11}$-$8\times10^{11}$/g dry feces, and makes up to about 50% of fecal solids in subjects on a Western diet. Gas production from colonic fermentation can also have some influence on stool bulk. Trapping of gas can contribute to increased volume and a decrease in fecal transit time.

The metabolic end products of fermentation, namely the gases, SCFA and increased microflora play a pivotal role in the physiological effects of the undigestible carbohydrate in the colon and implications for local effects in the colon and systemic effects. The gases produced from fermentation by strict anaerobic species, such as *bacteriodes*, some non-pathogenic species of clostridia and yeasts, anaerobic cocci, and some species of lactobacilli, are mostly released as flatulence or are absorbed and subsequently lost from the body through the lungs. However, some of the hydrogen and carbon dioxide produced from these microflora may be further metabolized to methane ($CH_4$) by methanogenic bacteria, thus reducing intestinal gas pressure. Of these anaerobic microorganisms, the clostridia, eubacteria and anaerobic cocci are the most gas producing, while the bifidobacteria are the only group of common gut microflora that do not produce any gases.

The energy content or caloric value of protected digestible carbohydrates in a food can be from the carbohydrate being fermented in the colon, versus being digested and absorbed in the small intestine as digested carbohydrate. Postprandial glycemic and hyperlipidemic responses are attenuated by the film forming and viscosity building properties of hydrocolloids. The non-digestible hydrocolloid films protect the digestible carbohydrates from interaction with carbohydrate digesting enzymes. The viscosifying properties of hydrocolloids reduce carbohydrate absorption in the small intestine by thickening intestinal contents, which diminishes peristaltic mixing and the diffusion of digested carbohydrates moieties. SCFAs absorbed into the portal blood system and reaching the liver can influence glucose and lipid metabolism. They attenuate blood glucose levels, as well as blood levels of cholesterol and triglycerides. Once digestible carbohydrate by-passes digestion and absorption in the small intestine, and is fermented in the colon, the SCFA resulting from this process provide a certain amount of energy from their absorption from the colon and subsequent metabolism in the liver. The energy content or caloric value of an non-digestible carbohydrate is from a scientific standpoint dependent on the degree of fermentation. Non-digestible carbohydrates that are not fermented to any extent have a caloric content approaching 0 kcal/gram, while data from caloric studies indicate that the average energy yield from their fermentation to SCFA and there oxidation in the liver in monogastric species is in the range of 1.5 to 2.5 kcal/g, rather than 4.0 kcal/g from its digestion and absorption in the small intestine and subsequent oxidation in the liver. This is due to loss of energy from the formation of bacterial biomass, gases, and heat from the non-digestible carbohydrate fermentation process.

The primary SCFA generated by fermentation are acetate, propionate and butyrate, accounting for 83-95% of the total SCFA concentration in the large intestine, which ranges from about 60-150 μmol/L. The concentrations of these acids are highest where concentrations of microflora are also highest, namely in the cecum and right or transverse colon. Corresponding to these higher acid levels, the pH is also typically lowest in the transverse colon (5.4-5.9) and gradually increases through the distal colon to 6.6-6.9. As the pH is reduced, the colonic environment becomes less favorable for toxin-producing and ill-health promoting microflora, such as *E. coli*, clostridia, and certain yeasts.

At the colonic level, the fermentation of the undigestible carbohydrate increases the concentration of these health-promoting SCFA and endogenous, more pH tolerant microflora, such as the bifidobacteria, to exert potential health effects such as 1) influencing mucosal cell growth and blood flow, 2) increasing mucus production 3) acting as cellular differentiating agents (anti-tumor effects), 4) preventing colitis, and 5) improving mineral absorption, such as calcium or magnesium, inhibiting the growth of pathogens. The SCFA, particularly propionate, absorbed into the portal blood system and reaching the liver and kidneys can further influence metabolism. This can lead to systemic effects such as reduction in glycemia, lipidemia, uremia and improvements in overall nitrogen balance. Influence on lipids is an example of a potential health effect; as high serum lipid levels are connected with a increased risk of cardiovascular disease. Additionally, low glycogen production and high glucose production in the liver is consistent with creating insulin resistant over time, resulting in diabetic consequences. This risk may be lowered by the consumption of undigested, fermentable protected carbohydrates.

In addition to its effects on host metabolism, the undigested, fermentable, protected carbohydrate also has relationship with reducing the risk of colon carcinogenesis. The fermentation of well fermented carbohydrate sources, as created through practicing the present invention, leads to butyric acid, the majority (about 90%) is thought to be metabolized to $CO_2$ and ketone as preferred substrate for colonocytes, providing 70% of their total energy, and preventing them, as a potent differentiating agent in cell culture, from conversion to tumor development.

Modified Carbohydrate-Based Food Ingredient:

Another embodiment of the present invention relates to a modified carbohydrate-based food ingredient that comprises a digestible carbohydrate-based ingredient, and a non-digestible protective ingredient. A typical digestible carbohydrate-based ingredient is a grain flour. In the making of food products containing digestible carbohydrates, both domestically and institutionally, a digestible carbohydrate-based ingredient, such as a vegetable or fruit flour, is a common ingredient in the food preparation process. Typical grain flours include those derived from grains such as wheat and barley, grasses such as corn and rice, legumes such as soy beans, beans, and yellow chickpeas, and tubers such as potatoes. The present invention provides that conventional flours can be modified with the addition of the non-digestible protective ingredient of the present invention, to provide a modified flour.

Typical non-digestible protective ingredients are particulate in form. Typically, the non-digestible ingredient is processed into the conventional flour as a hydrated slurry or solution, formed as described above. Alternatively, a particulate form of the non-digestible ingredient can be processed with the flour to form the modified flour. Although the modified flours can be made using conventional powder mixing equipment systems and techniques, it is preferred to use processing equipment and techniques that employ higher shear and lower contact times than do conventional systems.

Typically the modified flour has physical properties comparable to those of the unmodified flour, and can be processed into food products originating from a dough in accordance with the present invention, which include but are not limited to, pastas, rice, potatoes, tortillas, breads and bakery products. Dough systems made with the invention have enhanced rheology to aid the production processes used to make various reduced carbohydrate products. Dough have better machinability, to reduce stickiness in extrusion dies and tortilla presses, for example. Dough has reduced viscosity to reduce extrusion die pressure, while reducing power consumption and helping to enhance yields.

Another embodiment of the present invention relates a food ingredient that can be sprinkled onto or added into a food to protect digestible carbohydrates from being digesting, or that will result in an increased viscosity of the chyme. Such food ingredient can blunt the blood glucose response of the treated food. The food ingredient can be a seasoning, flavoring or texture modifier. The food ingredient can comprise a particulate or a liquid composition. The food ingredient can be used to prepare foods such as sauces, gravies, bakery mixes, pancake mixes, and beverages. The food ingredient can be a light sauce or glazing product, which can be used as a glaze or dip for food products, like vegetables and fruits.

Non-Digestible Hydrocolloids:

The following Table A provides a list of preferred non-digestible hydrocolloids, with selected physical data. Selected hydrocolloids below are discussed thereafter.

TABLE A

| Hydrocolloid | Backbone and side chains | Viscosity & MW | Ionic Reactivity | Solubility in Water |
|---|---|---|---|---|
| Xanthan Gum | β-1-4-D-glucosyl; α-1-3 Trisaccharide: D-mannose-β-1-2-D-glucouronic-β-1-4-mannose with terminal pyruvate | 1500-1600 cps (1% solution with 1% KCl @ 25 C.) MW ~15 million | Limited at low conc. | Soluble in cold water |
| Guar Gum | β-1-4-D-mannose with branchpoints from the 6 position; β-D-galactose | 1600 to 2000 cps (1% solution @ 25 C.) MW ~75000 | Very low | Soluble @ 25 C. |
| Pectin (low methoxyl) | α-1,4-D-galacturonic acid; Neutral chains of L-arabinose & D-galactose | MW 50 to 150,000 | Ca++ | Lumps; seperate particles and shear |
| Pectin (High methoxyl) | α1,4-D-galacturonic acid; Neutral chains of L-arabinose & D-galactose | MW 150 to 200,000 | | |
| Alginate | β-1-4 L-mannuronic acid, α-1-4-L-guluronic acid; Unbranched | 150-300 cps (1% solution @ 20 C.) | Ba++ Sr++ Ca++ Mg++ | soluble in cold water; Ca++ reduces solubility |
| Carrageenan (Kappa) | Galactose & 3,6-anhydrogalactose; Sulphated and non-sulphated galactose units | 225,000 | K+ Na+ | Na+ salt sol. in cold water; K+ salt sol. in hot water |
| Locust Bean Gum | β-1-4-D-mannose with branch points from the 6 position; α-D-galactose | 50,000 to 3 million | Very low | Less Soluble than Guar |
| Tragacanth Gum | Poly-D-galacturonic acid; Xylose, fucose, & galactose | 100-3500 cps (1% solution @ 25 C.) MW ~840,000 | Very low | Soluble in cold and hot water |
| Karaya Gum | αD-galacturonic acid and α-L-Rhamnose; β-D-galactose; β-D-glucuronic acid | 2000-3000 cps (1% solution @ 25 C. MW 9-16 MM | Very low | Slightly soluble in hot and cold water |
| Konjac (flour) mannan | β-1-4-linked D-Glucose and D-Mannose (glucomannan) | 1% solution 25 cps; 2% solution 350 cps | No | Soluble at RT with good stirring |
| Inulin | β-D((2,1)-fructofranosyl)n α-D(1,2)-gluco-pyranoside | DP 5-60, avg. 25; avg. 4550 MW | Very low | Soluble in hot water; sparingly soluble in cold |
| Glucan | Glucose polymer joined by 1-4 & 1-3 β-linkages; None | MW 15,000 to 150,000 | Very low | Dissolves in water >75 C. |
| Tamarind Gum | β-1-4-D-glucosyl | MW ~115,000 | Very low | Soluble in cold water |

Xanthan Gum:

Xanthan gum is a food gum that was developed as a very stable thickening agent for pourable salad dressings, sauces and gravies, pastry fillings, puddings, several dairy products, and fruit juices. It is an excellent thickener at low concentrations. Xanthan gum is a rigid structure having a cellulose backbone with three beta-1-4 linked sugar side chains (D-glucose-2.8 moles, D-mannose-2.0 moles, D-glucuronic-2.0 moles). It is pseudoplastic (thins when shear is applied), and contributes good adhesion and coating properties. It is both cold and hot water soluble. In the absence of shear it produces a gel-like structure and high viscosity at low concentrations. Xanthan gum/guar gum and xanthan/locust bean gum mixtures exhibit synergistic increase in viscosity. Viscosity properties are somewhat affected by ions, but relatively stable in acid, salt and at elevated temperatures. Xanthan is stable to freezing temperatures, but is retort unstable, which is improved by 0.1% sodium chloride (NaCl). Xanthan gum solutions exhibit little solution viscosity change over a wide temperature range, and typically fully recover their viscosity after shearing. Xanthan gum is made by the bacterium *Xanthomonas campestris* utilizing sugars, like corn glucose, a common commercial way to make certain food ingredients. Xanthan gum can swell in gastric fluid to increase viscosity. Xanthan gum is resistant to human enzymes, and stable in both acid and alkaline conditions. It is not digested by the body, but reaches the colon intact where it is used for food by resident microflora that produce products of the fermentation process that help reduce cholesterol and smooth fluctuations in blood sugar, and help maintain the health of the large intestine.

Guar Gum:

Guar gum is a natural food emulsifier, thickener, and stabilizer that is used in many food products, such as frozen desserts, baked products, salad dressings, and cheese. This food gum is the storage carbohydrate that is extracted from the endosperm portion of the seed of a leguminous plant (*Cyamopsis tetragonolobus*). It is a non-ionic (uncharged) galactomannan polymer having a mannose polymeric backbone with galactose side chains. It is cold water soluble, which increases with increasing galactose side chains (greater than 25% galactose resulting in cold water solubility). Guar gum hydrates rapidly in cold water, with increasing hydration rate with increasing temperature, to give highly viscous pseudoplastic solutions of generally low shear viscosity. Guar gum is relatively unaffected by ions, pH, and is more susceptible to extreme temperature and shear than most other gums. Guar gum modifies properties when used with kappa-carrageenan or xanthan gum to give rise to synergistic viscosity increase without gel formation. It has good coating properties. Partial hydrolysis of guar gum in acid results in lower viscosity. Solutions are not affected by ionic strength or pH. Guar gum shows viscosity synergism with xanthan gum. It has been used for colonic delivery as a non-digestible carbohydrates that ferments to short chain fatty acids in colon. The ingredient has been shown to improve bowel functions, reduce diarrhea, relieve diarrhea and helps reduce "bad" cholesterol and blood triglycerides levels and normalize blood sugar levels after a meal.

Locust Bean Gum (LBG):

Locust bean gum is another galactomannan, like guar gum. It has a mannose polymeric backbone with galactose side chains with a molecule weight of about 330,000. Unlike guar gum, it is not cold water soluble, as it has only between 18-24% galactose side chains. It is uncharged and relatively unaffected by ions, pH, and is susceptible to extremes in temperature and shear. Locust bean gum requires high temperature to hydrate, typically becoming fully hydrated if heated 10 minutes at 80° C., the solutions being cloudy, off-white. The gels formed after hydration are shear-thinning (pseudoplastic). Like guar gum, locust bean gum modifies gel properties of kappa carrageenan or xanthan gum. Xanthan gum has stronger association with less highly substituted mannan backbone of LBG than with guar gum. Locust bean gum forms elastic combination gels above 0.4% total gum content. Alike guar gum, locust bean gum is readily fermented in human gut with modification of the human microflora to improve gut health and function. Studies have shown hypolipidemic (lower triglyceride and cholesterol) effects and postprandial glucose (lower blood glucose levels and insulin response) effects.

Pectins:

These natural complexed food carbohydrates are present in the cell walls of many plants, such as apples, citrus fruits, sunflowers and sugar beets. Commercial pectin is a non-digestible carbohydrate that is usually extracted from apple pommace or citrus peels. Pectins are unbranched polymers of 200-1,000 galactose units, linked by beta-1-4 glucosidic bonds (polymers of D-galacturonic acid). Pectin functionality is due to the sequences of polygalacturonic acid and their extent of methyl esterification. Pectins are characterized on their degree of methyl esterification, which controls gel set rate. High methoxyl (HM) pectins are characterized as those having methoxyl contents of greater than 50%, while low methoxyl (LM) pectins typically have less than 50% methyoxyl content. Rapid set pectins typically have methyoxyl contents between 70-85%, while slow set pectins have methyoxyl contents between 44-65%. HM pectin requires low pH (<3.5) & high D.S. (>60° Brix) to form gels, but form excellent brittle films. As disclosed in the invention, pectin-containing films must be modified with water-attracting plasticizers to enhance flexibility for there use in the invention. HM used as the gelling agent in regular jams and jellies. LM pectin forms gels by calcium ion-induced interchain associations. Amidated LM pectins are used to gel natural fruit preserves. HM pectins stabilize sour milk drinks as they react with casein (milk protein). LM pectins are also used for milk gels due to calcium interaction. Pectin is typically used to help gel fruit jams and jellies, and some fermented milk products, such as yogurts and yogurt beverages. Studies have shown that pectin helps decrease the rate that the stomach empties and slow the movement of food through the small intestine, thus helping to slow the absorption of sugar into the blood and smooth blood sugar fluctuations. It also has been shown to help decrease "bad" (LDL) cholesterol levels, while not changing the "good" (HDL) cholesterol levels.

Carrageenan:

Carrageenan is a natural non-digestible carbohydrate extracted from red algae (Rhodophyceae), a seaweed common in the Atlantic Ocean near Britain, Continental Europe and North America. Carrageenans are polydispersed (no two molecules are identical). Three forms exist (kappa, iota, lambda) structurally they differ by their ester sulfate and 3,6 anhydrogalactose cotents. The galactose backbone ester sulfate gives negative charge. Ahydrogalactose units in the main chain are required for gelatin synergy and the extent of sulfation controls gel texture. The kappa and iota types, both having 3, 6 anhydro sugar, form gels, while lambda, without the sugar, does not gel and functions as a thickener. Kapp carrageenans produce brittle gels with potassium interaction, while iota form elastic gels with calcium interaction. Carrageenan interacts with caseinates to stabilize the gel, which depends on the number and position of the sulfate group. Anions form stable colloidal protein-carrageenan complexes.

Carrageenans are used to thicken some processed foods like ice cream, marshmallow fluff, pancake syrup, dairy-based desserts, breakfast shakes and puddings, and processed meats; to stabilize or emulsify foods, helping liquids stay mixed together, like in chocolate milk; and to help stabilize crystals, such as in confections and frozen desserts, by slowing the formation of sugar or ice crystals. In the sense of natural creation, it is not much different than tomato paste in its creation. As a non-digestible carbohydrate, carrageenan is not digested by the human body, but is completely fermented in the colon by resident microflora to give health benefits. Studies have shown it helps increase intestinal viscosity, decreasing gastric emptying and small intestinal transit time (hypoglycemic properties). This process slows the rate of sugar into the blood, like pectin and guar gum, and is fermented to produce products from the fermentation that influence blood sugar formation and cholesterol production in the liver.

Alginates:

Alginates are natural food extracts of the brown algae (Phaeophyceae). They are unbranched linear polymers composed of beta-1-4-D-mannuronic acids and alpha-1-4-L-guluronic acid residues. Alginate gels require counterions, such as calcium to form. Normal ions content is between 0.5-1%. Viscosity increases at low concentrations, increasing with increasing calcium content; viscosity of 1% from 1- to 2000 centipose (cP) as a function of molecular weight and calcium content. Film (gel) formation is mediated by controlled calcium release in systems through competition by sequestrants, i.e. sodium citrate. Alginates precipitate below pH 3 and degrades above pH 6.5. Propylene glycol improves their stability to calcium and acid. Propylene glycol alginate gels are designed to provide better acid stability and reduced precipitation at low pH, as that used in salad dressings. Alginate and propylene glycol alginate systems are used in dairy products, bakery products (fruit filing, texture and gelatin modification, in frozen desserts to resist ice crystal formation and overrun (air) stabilization. Alginates are non-digestible carbohydrates and are readily fermented in the human gut to short chain fatty acids to provide health benefits.

Gellan Gum:

Gellan gum is composed of two beta-glucose units plus beta-glucuronic acids and rhamnose units. It is produced by the bacterium *Pseudomonas elodea* and has a high molecule weight (1,000,000). Gellan gum is insoluble in cold water and gels with high heat and calcium ions. Gellan gum produces hard gels or more tender (modified) gels with added LBG or xanthan gum. Gellan gum is similar to agar, carrageenan, and alginates in functionality. Gel formation is brought about by aggregation of double helices upon cooling, and is induced by all ions, including hydrogen ions from acid addition. Gellan gum adds viscosity in foods and the small intestine and is readily fermented to short chain fatty acids in the colon.

Inulin:

Inulin is a non-digestible polymer of fructose. It is the natural storage carbohydrate found in over 36,000 plants worldwide and after starch is the most plentiful carbohydrate in nature. It is found in commonly consumed fruits and vegetables as onions, garlic, wheat, raisins, tomatoes, bananas, asparagus, and chicory root or its leaves (Belgian endive). It primary is produced commercially via extraction and purification from the chicory root (*Cichorium intybus*). It is an unbranched linear polymer of beta-2-1-linked fructose molecules with a terminal alpha-1-2-linked glucose unit; as in sucrose. Native chicory inulin typically has a range of degree of polymerization (DP) of 2-60 fructose units, having and average of 9-12 units. It is soluble in cold and hot water to produce clear solutions (12 grams/L at room temperature), solubility and clarity being dependent on the polymeric chain distribution. The inulin molecule is unstable in high water, low pH environments (<pH 4.0), hydrolyzing to fructose. Shorter chain fractions, such as those having a degree of polymerization (DP) of 2-5 or 2-8 units or an average of about 4 units, are highly soluble in water (750 grams/L at room temperature), are very hygroscopic (attracting water) and have humectant properties for use as plasticizers in the invention. Products of this type of inulin have low viscosity (5% inulin typically are about 10% or less the viscosity of sucrose). These products are available commercially as Nutraflora® scFOS from Golden Technologies, Inc (CO)., Rafilose® P95 from Orafti Food Ingredients (PA), and Frutafit® CLR from Sensus America, LLC (NJ). Native inulin from chicory root is a mixture of polymeric chains (polydispersed) having a DP of 2-60 fructose units with an average of 9-12 units. Native inulin provides multifunction, as having humectant properties, providing water binding properties and form weak pseudoplastic particle gels. Particle gels of this type form at about 25% inulin content by weight, with increasing viscosity and firmness with increasing concentration. Particle gels have increased strength with addition of cations, such as calcium (0.25-1%). Gels formed are shear thinning (pseudoplastic). Gels stabilize foams and aid in emulsions, especially when used with carrageenan-based gum systems. Examples of commercially available products having these characteristics are Oliggo-fiber® ST from Cargill Inc (MN); Fribriline® ST from Cosucra (Belgium), Raftiline® ST from Orafti Food Ingredient (PA)s; and Frutafit® HD from Sensus America, LLC(NJ). Physically fractionated inulins having higher DP, such as those having a DP range of 5-60 fructose units with an average of 25 units, provide pseudoplastic gel formation (beginning at 12.5%), bind water, enhance food structure, and help minimize water migration in foods. Commercial examples of such products are Raftiline® HP from Orafti Food Ingredients (PA), Fibriline® LC from Cosucra (Belgium), and Frutafit® TEX! from Sensus America, LLC(NJ). Unlike the normal starch in foods, inulin is not digested by the body, but is used as a preferred food (dietary fiber) by a select group of health-promoting bacteria in the colon (bifidobacteria and lactobacilli); the same bacteria as those used as active cultures found in many yogurts, and other fermented dairy products. These bacteria use inulin selectively to grow and produce fermentation products, such as SCFA to help support the immune system, regulate carbohydrate and lipid (fat) metabolism in the liver, help improve calcium absorption for strong bones and teeth, help support healthy immune function, and help keep the colon healthy for proper digestion of food and recycling of water to reduce dehydration effects.

Resistant Starches:

Ordinary starches are digested by carbohydrate digesting enzymes, such as pancreatic amylase, alpha-dextrinase, maltase, sucrase, and lactase. The resistant starches that are useful in the invention are defined as the sum of starch and starch products of starch degradation that is not broken down by human enzymes in the small intestine of healthy individuals. Resistant starches are considered to be dietary fiber. They are not digested in the small intestine, but are fermented in the colon.

Resistant starches useful in the present invention are classified based on the origin of their resistance.

The resistance of RS1 starches is a resultant of the entrapment of digestible starch that protects it from attack by digestive enzymes. Examples of RS1 starches include partially milled grains, partially chewed rice and cereal, and seeds. The resistance of RS1 starches can be varied by the degree and types of processing such as found in partially milled grains.

RS2 starches involve starch granules that are resistant until they are gelatinized (starch granules hydrate and rupture). RS3 relates to the retrogradation or reassociation of starch polymer after gelatinization. RS4 are chemically modified starches that are resistant. Based on the above classification digestible carbohydrates of the invention would be considered to be RS1 starches in that they are entrapped in the hydrocolloid film and the viscosified gastrointestinal content, which protects them from attack by digestive enzymes. Starch that is resistant to digestion has been shown in scientific study to help control blood sugar and blood cholesterol and triglyceride levels, normalize insulin levels, and help improve the health of the colon lining, thus reducing the potential for ulcers and inflammatory bowel disorders and risk of colon cancers.

The complete hydrocolloid film forming systems employed in foods of this invention may contain added hydrocolloids as well as hydrocolloids that pre-exist in a particular food for which a film is being prepared, such as β-glucan and gluten in a grain product.

Foodstuffs are very complex materials and when coupled with the multifactorial functionality of the hydrocolloids, varying compositions and levels of hydrocolloids and supportive chemical elements may be required to optimize film performance.

Processes:

Different approaches to adding the non-digestible food film components and the viscosity building components into the digestible carbohydrate-based ingredient can be used.

In one embodiment, the invention provides a method for making a reduced digestible carbohydrate food, comprising the steps of: providing a hydrocolloid composition comprising one or more, or all, hydrocolloids materials; pre-hydrating the hydrocolloid composition into a slurry; and processing the pre-hydrated hydrocolloid composition into a digestible carbohydrate-based ingredient to form a dough; and optionally processing the dough by proofing and/or drying, to form the reduced digestible carbohydrate food or food ingredient.

The processing typically comprises the step of mixing under applied shear the hydrocolloid into or with the digestible carbohydrate-based ingredient (for example, a flour) for a period of time sufficient to form a digestion-resistant food material having an effective protective food film network, or alternatively, having an effectively dispersed hydrocolloidal viscosity-building component.

Different types of processing equipment and processing conditions can be used to mix and hydrate the components of a film system prior to addition to a carbohydrate-based food ingredient, and for achieving the final incorporation of the film into the food. Processing approaches must be properly selected for developing films in foods when non-hydrated food film components are incorporated during the production of the food product. The selection of processing equipment and conditions will be dependant on the composition of the film used, the kind of food product to which it is applied, and the characteristics and performance of the film desired. Processing can influence how the food film network is distributed and embodied within the food matrix. It also can affect film characteristics both during their preparation and incorporation into the food matrix. Processing can affect a film's rheology, strength, and influence on chyme viscosity. Pre-hydrated gums used in the compositions and processes of the present invention can be selected to minimize competition for water or moisture with other components, including the flour.

An important processing consideration is the amount of mixing shear to be applied. High shear mixing applied to hydrated film preparations can provide uniformity of component distribution and in some cases desired molecular interaction. High to medium shear mixing can be used to incorporate and develop film systems in foods. High shear mixing in twin-screw extrusion processes can provide intimate interaction of film components in a plasticized mixture of food and film components. For a particular food ingredient and hydrocolloid system, mixing intensity and mixing time should be controlled. The time and intensity of high shear mixing can be optimized by persons of ordinary skill in the art in order to achieve good film properties and proper distribution of the protective food film network. One can expect that over-shearing of a hydrocolloid food films can reduce its desired properties and functionality.

In another embodiment, the invention provides a method for making a reduced digestible carbohydrate food, comprising the steps of: providing a hydrocolloid composition comprising at least one non-digestible hydrocolloid material; pre-hydrating the hydrocolloid composition; and processing the pre-hydrated hydrocolloid composition into a digestible carbohydrate-based ingredient that comprises a native hydrocolloid to form a dough, and optionally processing the dough by proofing and/or drying, to form the reduced digestible carbohydrate food.

In yet another embodiment, the invention provides a method for making a reduced digestible carbohydrate food, comprising the steps of: providing a hydrocolloid composition comprising at least one non-digestible hydrocolloid material; admixing the hydrocolloid composition with one or more dry food ingredients that comprise a digestible carbohydrate-based ingredient; and hydrating and processing the admixture of hydrocolloid and dry food ingredient to form a dough, and optionally processing the dough by proofing and/or drying, to form the reduced digestible carbohydrate food. In this embodiment, the particle size of the non-digestible materials typically have a particle size comparable to the particle size of the flour, to provide rapid and efficient hydration. The smaller the particle size of the non-digestible material, the more surface area and the greater the hydration efficiency. Larger particle sizes result in significantly better dispersion and good overall hydration if only low sheer mixing equipment is available. Typically, the non-digestible hydrocolloids having a particle size range of about 40 to about 200 microns, and more typically of less than about 75 microns.

Food Products:

Protective food film networks can be designed for digestible carbohydrate-based ingredients that can be employed in wide range of food product types and categories. As used herein, a food product made according to the present invention can be for human or animal consumption, and includes without limitation a food for pets and livestock and farm animals. Food categories where the invention technology is applicable include, but are not limited to: pasta (all types including noodles), reconstructed or formed rice, restructured or formed potatoes (mashed, instant flakes, and reconstructed potato products such as tater tots, French fries, hash browns, and chips), beverages, bakery products, desserts, sauces, gravies and soups, food bars, confection (including frostings), cereals, and snacks such as chips and extruded, expanded snacks. Bakery products can include breads, which can include as examples ordinary loaf bread, toasts, buns, rolls, croissants, pretzels (soft and hard), pizza dough (frozen and fresh), English muffins, bread sticks, flat breads, pita breads, tortillas, croutons, bread and breader crumbs, sweet breads, muffins, doughnuts, chips and bagels. Unleavened bread is prepared without a leavening agent. Bakery products can also include as examples cakes, cookies, pastry doughs and pastry products.

Pasta:

A typical food category employing the compositions and methods of the present invention is pasta. The pasta food according to the present invention can be hand-made or in highly automated and technologically-advanced manufacturing facilities, where the individual pasta shapes (spaghetti, noodles, bow ties, rigatoni, etc.) are typically made by drying an extruded pasta dough. A preferred flour for making pasta is durum semolina. Durum wheat (*Triticum durum*) is a high-gluten, exceptionally hard wheat. "Semolina" refers to the milling texture rather than the particular grain; semolina has the texture of fine sand and according to federal regulations can only contain 3% "flour" (much finer-milled powder). "Granular durum" is essentially semolina with between 3% and 10% flour content instead of less than 3%). The highest-grade durum, milled as semolina, gives the pasta elasticity and helps it to cook up firmer than pasta made with soft-wheat flour, which tends to break more easily and cook to a soft, limp, sticky consistency.

The pasta made in accordance with the present invention typically comprises, by weight, at least about 50%, more typically at least 75%, and even more typically at least about 85%, and up to about 98% flour, more typically up to about 90%, of flour. The pasta also typically comprises, by weight, at least about 2%, and more typically at least about 5%, of the non-digestible protective material, and up to about 40%, more typically up to about 15%, and even more typically up to about 10%, of the non-digestible protective material.

The non-digestible protective material comprised in the pasta can comprise, by weight, typically at least 10%, more typically at least about 20%, and even more typically at least about 30%, and up to about 70%, more typically up to about 60% and even more typically up to about 40%, of the structural and viscous food film component selected from at least one, and typically both, of the structural/viscous fermentable material and the structural protein polymer. The non-digestible protective material comprised in the pasta can comprise, by weight, typically at least about 25%, more typically at least about 35%, and up to about 90%, and more typically up to about 70%, of the rheology modifier material. The non-digestible protective material comprised in the pasta can optionally comprise, by weight, typically at least about 0.5%, more typically at least about 1%, even more typically at least about 3%, and typically up to about 20%, more typically up to about 10%, and even more typically up to about 5%, by weight, of the ionic property modifier.

In the manufacture of the pasta, the practice of the present invention has shown a significant reduction in "checking". Checking refers to pasta product crumbling or disintegration during storage when pasta looses or gains moisture. The phenomena is exacerbated by poor extrusion, drying or storage conditions and the phenomena is observed, most frequently, in pastas at the beginning and end of an extrusion process. It is at this time that temperature and humidity changes in the drying chamber fluctuate considerably and are least uniform. Checks are manifest by small cracks, apparent in pasta as tiny white lines, which can also cause the pasta to break up and fall apart as it cooks. "Checking" observations have been made on pasta samples produced in accordance with the present invention and indicate that the use of the non-digestible protective ingredient in the manufacture of pasta results in a very significant reduction in checking. Consequently, a further embodiment of the invention is the use of a non-digestible protective ingredient as described herein for reducing the phenomenon known as "checking" in the production of pasta.

It has been observed that the cooked pasta products made in accordance with the present invention have an improved bite compared to conventional pasta, and relative to the same pasta formula without the non-digestible protective ingredient of the present invention. The term "bite" comes from the Italian term "al dente", which means "to the bite", and is used to describe the correct degree of doneness for pasta. A pasta with a preferred bite should retain a slight resistance when biting into it, but should not have a hard center. Consequently, a further embodiment of the invention is the use of a non-digestible protective ingredient as described herein in the making of pasta to improve the bite of the cooked pasta. The principle contributing material to the improved structure and bite of the pasta are the structure/viscous fermentable material and the structural protein polymers.

It has been observed that a cooked pasta product made in accordance with the present invention has an increased level of water retained in the cooked pasta, compared to conventional pasta, and relative to the same pasta formula without the non-digestible protective ingredient of the present invention. The amount of water uptake of conventional cooked pasta is approximately 100% of the dry weight of the pasta, meaning that 400 grams of dry pasta will absorb and retain water to have a final cooked weight of about 800 grams. Pasta made in accordance with the present invention can retain at least about 10%, more typically at least about 20%, and even more typically at least about 40%, more water when compared to a comparable, conventional pasta, normalized for the amount of wheat flour used. Therefore, even accounting for dilution of the wheat flour by the non-digestible protective ingredient, the cooked pasta of the present invention holds significantly greater amount of water per dry unit of wheat flour. Consequently, a further embodiment of the invention is the use of a non-digestible protective ingredient in a pasta product for increasing the amount of water in the cooked pasta, and a cooked pasta comprising an increased level of moisture, per weight unit of digestible carbohydrate-based food ingredient, where the digestible carbohydrate-based food ingredient can be wheat flour.

The increase in water binding of the cooked pasta also reduced the cooking losses. It has actually been observed that the use of the non-digestible materials of the present invention results in a cooking gain. Conventional pasta is defined as being very good when the cooking losses are less than 5.5%; good when between 5.6% and 6%, fine if between 6.5% and 7.5%, and poor if the losses are greater than 7.5%. High quality conventional pasta usually has about 4% cooking loss. Pastas made in accordance with the present invention are typically low, between 2% and 5%. In one example of a reduced digestible pasta, having a non-digestible material content of 8.6% and consisting of 0.90% vital wheat gluten, 0.60% modified wheat gluten, 1.00% xanthan gum, 0.30% high methoxy pectin, 0.30% potassium chloride, 2.50% sorbitol, and 3.00% inulin. The pasta has a cooking loss of between 2.3% and 2.55%.

It has also been observed that the cooked pasta made in accordance with the present invention has acceptable, and more typically improved, integrity, bite and structure, relative to conventional cooked pasta. Consequently, a further embodiment of the invention is the use of a non-digestible protective ingredient in a pasta product for improving the physical integrity, bite and structure of the cooked pasta.

Food products of the present invention can also be made with flours of various fruits and vegetables, including, but not limited to wheat, rye, barley, oat and sorghum, rice, corn, and potato flours. The invention also therefore relates to reducing the phenomenon known as "checking" in the production of reconstituted rice and other extruded and dried dough products made from such flours, and to improving the bite and the physical integrity, and increasing the amount of water retained, in the cooked, reconstituted rice and other cooked products.

As an example of an application of the invention, pasta can be made using various flour systems, such as using standard semolina flour that is modified using a combination of a food film component comprising a structural/viscous fermentable material, a structural protein polymer, a rheology modifier/plasticizer, and an ionic property modifier, whereby a well mixed blend of ingredients related to the invention, comprised of a ratio of about 33% food film component; 65% rheology modifier and 2% ionic property modifier, is added at a level of about 4-11% to the flour using high sheer mixing for about 10 seconds. The dry ingredients after mixing are fed into a commercial pasta press, where 100-120° F. water is added by mixing into the dry ingredients at a rate to meet the formula level of water and to produce an extrudable dough. The dough is extruded through a pasta die that would produce various pasta shapes, such as Ziti, penne, elbows, spaghetti, and the like. The moisture content of the extruded pasta is 29-35%. The wet product is dried to 12% moisture using a pasta dryer.

Other flour types, such as long grain rice flour may be used in total replacement of the semonlina or wheat flour with little or not modification to the process. Alternatively, other flour types such as soy flour, pea flour, other legume flours, and root flours can be used in partial replacement of wheat flour, standard semolina flour and the like, the replacement depending on the organoleptic and physical characteristics, such as color and desires of the finished pasta product.

In an example of this embodiment a reduced digestible carbohydrate dry pasta is made by producing a pre-hydrated hydrocolloid film incorporating the film into a dough by addition through the water addition port of a pasta press, pressing the dough through a pasta die in desired shapes and subsequently dried in a pasta drier. The prehydrated hydrocolloid film is made having a composition containing 85% water; 5.3% inulin; 6.2% sorbitol; 0.9% xanthan gum; 1.2% kappa carrageenan; 0.7% high methoxyl citrus pectin; and 0.7% potassium chloride (KCl). Xanthan gum is available as TIC Prehydrated NT. Kappa carragennan is also available from TIC Gums. HM Pectin is high methoxyl pectin, available as Kelco 150 B Rapid Set from CP Kelco. Inulin is Frutafit® CLR, available from Sensus America, LLC. The sorbitol is available from Roquette.

Prehydrated films of this type may be made and incorporated into flours of various types to make dough of rice to produce restructured rice products; potato flour for restructured potato products; wheat flour for bread and other baked products; tortillas, pretzels, and other like dough systems.

Potatoes:

Restructured potato products, such as French fries, hash browns, tator tots, potato chips and the like can be produced using a combination of standard potato flour, modified with a combination of various components of the invention, such as a structural and viscous food film component that is between 45-60%; a rheology modifier portion of 30-40%; and an ionic property modifier of 2-4%, combined to the flour at a level of about 4-20% using high sheer mixing. Cold water (50-63° F.) is added while mixing at medium sheer to produce a cold mash in a ratio of 170 parts water to about 100 parts dry modified flour weight. The resultant cold mash is pressed through a low pressure vertical press containing a suitable die having the desired shape and the length of the resultant strands are cut using a rotating cutting tool.

In the case of French fries, the resultant fries are either cooked in vegetable oil at 356-365° F. for 90 seconds for immediate consumption or 30-45 seconds and quick frozen for par cooked French fries. In the case of tator tots, the mash is pressed into forms and cooked as for French fries. In the case of hash browns, resultant thin strands of the pressing operation are formed into patties. In the case of restructured potato chips, the cold mash is placed in molds and baked to crispiness. Alternatively, soy flour, all purpose wheat flour, long grain rice flour, and other flours may be used at various levels to replace portions of the potato flour, as desired.

Reconstructed Rice:

In yet another example of an application of the invention, restructured rice can be produced using rice flour modified with a combination of various components of the invention, such as a structural and viscous food film component between 12%; a rheology modifier portion of 70-80%; and an ionic property modifier of 2-4%, combined to the flour at a level of about 4-20% using high sheer mixing. The dry ingredients are metered into a pre-conditioner of twin-screw extruder where steam and water is added to bring the moisture content of the feed material to the extruder up to approximately 38% and temperature to 190° F. (88° C.). The pre-conditioned product is feed into a twin-screw extruder where the temperature of the product is maintained in the range of 190 to 198° F. (88-92° C.). The screw configuration provides good mixing prior to passing the product through a die that has been configured to provide typical rice kernel shapes upon being cut at the die. A low pressure is maintained to obtain good product shape. The temperature is maintained below 212° F. (100° C.) to avoid expansion of the product. The dwell time in the extruder is approximately 2 minutes. The moisture content at the die is in the range of 35 to 36%. The product is dried in a pasta-type dryer at about 140° F. (60° C.) and a relative humidity of around 70%. The resulting product is dried to near 12% moisture. Alternatively, soy flour, all purpose wheat flour, potato, and other flours may be used at various levels to replace portions of the rice flour, as desired.

Tortillas:

The invention can also relate to a method of making flour tortillas and related product using hard red spring wheat flour, all purpose flour, and other flour types modified with a combination of various components of the invention, such as a SVFBH between 45-60%; a RMP portion of 30-40%; and an IFM of 2-4%, combined to the flour at a level of about 4-20% using high sheer mixing. In addition to the flour modification system, an additional tortilla base is added at a level of between 0-5% to improve dough rheology, shelf stability and organoleptic properties, and is composed of but not limited to salt, baking powder, potassium sorbate, sodium benzoate, calcium propionate, sodium sterol lactylate, and mono-diglycerides. This base is mixed with the flour and flour modification blend in a high speed mixer for 5 minutes. Vegetable shortening is added into the dry blended mixture at a level between 3-7% of the formula weight while mixing for 2 minutes at high speed in a conventional roller or paddle mixer. Water at 82-86° F. is added while mixing a low speed in a roller or paddle mixer. Mixing is continued for an additional 2 minutes. Resultant dough is divided and balled into equal weight portions dependent on the size of tortilla being produced, i.e. 8 inch, 10 inch, 12 inch, etc. The divided dough balls are allowed to proof in a proofing cabinet for 5-10 minutes. Proofed dough balls are pressed into tortillas using a conventional tortilla press to about 0.008-0.10 inch thick.

Tortillas are then baked in a 500° F. direct-fired oven for 30 seconds or until cooked. Baked tortillas are cooled on cooling belt for 3 minutes to a finished moisture of about 30% and less than 90° F.

Cereal:

A further example of the use of the invention can also be related to a method of making corn and other cereals (flaked and expanded) using wheat flour, corn flours, barley flour, rice flour and related flour types modified by various combinations of the invention, such as a structural and viscous food film component between 15-25%; a rheology modifier portion of 35-65%; and an ionic property modifier of 5-15%, combined to the flour at a level of about 4-25%. The combination of the various components of this system are varied based on the type of cereal product being made, and is dependent on if the cereal is flaked or expanded. Additionally, either sucrose or a sugar replacement system consisting of a sugar alcohol, low viscosity non-digestible carbohydrate bulking agent, and/or a high intensity sweetener can be used. The sugar or its replacement system is added at a level of between 10-20% of the formula weight. This base flour modification system and sugar system is blended in a high speed powder mixer for 30 seconds to 5 minutes. The unit operations involved in the flake extrusion process are extrusion, tempering, flaking and toasting. This involves cooking and palletizing the cereal grain through the extrusion process. Following extrusion, the pellets are tempered, flaked and toasted. The dry flour/sugar blend is metered from a volumetric feeder into a pre-conditioning cylinder of a twin-screw extruder where steam and, water is added to bring the moisture content of the feed material to the extruder up to approximately 26-27%. The preconditioning cylinder is instrumental in this process for partially hydrating the material and for partial gelatinization of the starch granules. The pre-conditioned product is feed into a twin-screw extruder comprised of nine head elements with a L/D ratio of 25:1. Malt slurry is injected at head position 2 at a rate to maintain a level of about 4% of formula weight. Product temperature is maintained in the range of 196 to 210° F. The screw configuration provides good mixing prior to passing the product through a die that has been configured to provide typical cereal pellet shapes upon being cut at the die. A low die pressure is maintained to about 500 psi to obtain good product shape. The temperature is maintained below 212° F. to avoid expansion of the product. The moisture content of the pellets at the die is in the range of 27 to 38%. The pellets are tempered so that moisture could equilibrate uniformly. The tempering process consists of holding the pellets at constant room temperature for a period between 5-15 minutes to achieve uniform moisture distribution. Once tempered, the pellets are flaked in a flake mill by feeding through a Roskamp flaking mill. The moist and flaked cereal product is toasted at 300° F. for 3 minutes in a rotary tray drier. Toasted flakes are cooled on a cooling belt to less than 75° F. Expansion of cereal products is achieved in terms of the invention by increasing the cook temperature above 212° F., and potentially adding a small amount of native starch, followed by drying in a tray drier. Puffed or expanded snacks, such as corn puffs are made by a similar means.

Bread:

The invention can also relate to a method of baking breads and other bakery products, comprising the steps of: providing and adding a modified carbohydrate-based ingredient, typically as a modified carbohydrate-containing flour, adding water, mixing the modified flour into a dough or a batter mixture, and baking or cooking the dough or batter mixture to product a bread or bakery product having a reduced level of digestible carbohydrates and an amount of a protected carbohydrate. Alternatively, the method can replace the step of providing and adding the modified carbohydrate-based ingredient with the steps of: providing and adding a digestible carbohydrate-based ingredient, typically as a flour, and providing and adding a non-digestible protective ingredient.

Benefits of the invention are realized when ingesting a single food containing high levels of digestible carbohydrate (i.e. pasta, potatoes, rice, snacks, confections, beverages, sauces, and bakery products). Consuming a beverage containing hydrocolloid systems between meals, prior to a meal, and with a meal will provide satiating effects and will attenuate blood glucose response.

Pet Food:

Food products of the present invention can also include pet foods, including, but not limited to, dog food and cat food. A typical canine food product can contain from about 20 to about 40% crude protein, from about 4 to about 30% fat, and from about 35 to about 60 wt %, and preferably from about 40 to about 55 wt. %, digestible carbohydrate, by weight of the dog food composition. Attempts to control both postprandial blood glucose and insulin levels after a meal have focused on elimination of components that can contribute to higher responses in these levels. For example, compared to rice, it has been shown that corn, sorghum and barley generally resulted in a gradual rise and decline in glucose response. Use of the non-digestible protective ingredient in pet food compositions can reduce the postprandial blood glucose and insulin levels as described herein.

Optional Health-Promoting Nutritional Ingredients:

The various food products described herein can optionally comprise health-promoting nutritional ingredients, as necessary or as desired. Such optional ingredients can include, but are not limited to, ingredients to improve the food's influence on certain aspects of: human metabolism, such as sugar control, weight control or satiety, by including acetyl-L-carnitine, L-carnitine, and conjugated linoleic acid; calcium absorption, by including vitamin D; immune stimulation, by including cold processed whey protein concentrate, beta-glucans, mushroom extracts such as maitake and shitake; blood lipid control, by including cholesterol, triglycerides); agents to add cognitive effects, by including gingko biloba, phosphitydal serine or choline; antioxidant properties to minimize free radical cellular oxidation, by including grape seed extracts, Coenzyme Q, lutein, alpha lipoic acid, green tea extracts, astaxanthin and zeaxanthin, lycopene; and methylation enhancement by including betaine or trimethylglycine (TMG). The optional ingredients can include, but not be limited to, plant sterols and stanols, spices (such as cinnamon), trace minerals such as selenium, chromium, vanadium, manganese, zinc, copper and molybdenum, and omega 3 and 6 fatty acids.

Inulin and other non-digestible dietary fibers and hydrocolloids can also be used in amounts in the foods in excess of an amount needed to form an effective food film network. Typically, such levels of inulin and other dietary fibers are conveniently added into the food products in their dry or powdered form, although they can also be introduced in ahydrated form, and integral with the other food film materials. This allows a food to be provided with an effective food film network that can protect carbohydrates from digestion, and at the same time enables higher levels of inulin that can contribute improved health effects, beyond reduced carbohydrate digestion.

Test Method:
1) Blood Glucose Response (In Vivo):
The following method is used to determine the grams of digested carbohydrate in a serving of food that will be digested upon consumption:

Overall:

The level of digested carbohydrate in a serving of reduced digestible carbohydrate food is obtained by determining the glycemic index (GI) of the food serving, and then multiplied the GI by the available digestible carbohydrate content of the food serving. The level of digested carbohydrate in the food serving can also be referred to as the glycemic load of the food serving. (See Foster-Powell K, Holt SHA, Brand-Miller JC. International table of glycemic index and glycemic load values: 2002. Am J Clin Nutr 2002; 76:5-56).

The GI value of the food serving is determined by feeding a serving of the reduced digestible carbohydrate food (referred to hereinafter as the test food) to 10 or more healthy and qualified subjects that are not metabolically impaired. It is important to insure that each subject does not have impaired glucose tolerance. The test food serving size is selected to contain 25 grams of available digestible carbohydrate. The subject's blood glucose levels are measured over the following two hours. Similarly, white bread servings containing 25 grams of available digestible carbohydrate (the reference food) is fed to subjects, and blood glucose levels are measured over the following two-hour period.

The amount of available digestible carbohydrate in the test food is the sum of total sugars and total starches, as determined by methods AOAC 983.22 (total sugars) and 996.11 (total starches). (For cereals, methods AACC 80-04 (total sugars) and AACC 76-13 (total starches) should be used.) Methods AOAC 983.22 and 996.11, and AACC 80-04 and 76-13 are incorporated herein by reference.

The curve attained from measuring the blood glucose concentration over the two-hour test period is designated as the blood glucose or glycemic response curve. The area under the curve (AUC) is a measure of the blood glucose response associated with eating the test or reference food. The GI value for a particular test food is calculated by dividing the AUC for that test food by the AUC of the bread reference standard.

The amount of digested carbohydrate (the glycemic load) of the test food serving is determined by multiplying the amount of available digestible carbohydrate (25 grams) by the calculated GI.

Testing Method:

1. Test subjects arrive at the clinic in the morning after a 10 to 12-hour overnight fast. They are tested between 7:00 AM and 10:00 AM.

2. A fasting baseline blood glucose level is determined by duplicate testing of fingertip capillary blood obtained by a finger stick.

3. Subjects are randomly assigned to a test meal or white bread reference food.

4. The meals are eaten within a 3-minute time period.

5. 100 ml of water is offered with each meal.

6. After ingestion of the meal, subjects remain inactive during the 2-hour test so that blood glucose levels are not inappropriately affected.

7. Fingertip capillary blood samples are taken at 15, 30, 45, 60, 90, and 120 minutes.

8. Blood glucose levels are determined using a GM9D Analox blood analyzer, which is typically employed in a clinical laboratory for the purpose of medical diagnostics.

Test Requirements:

1. Each subject is fed a minimum of three test meals and five bread standards on different days.

2. if duplicate fasting blood glucose values differ from each other by more than 8 mg/dl, the test is aborted.

Pretest Subject Compliance Requirements:

1. A subject must not consume alcoholic beverages within 48 hours prior to testing.

2. The subject must not exercise for 12 hours prior to testing.

3. If a subject is ill or under extreme stress when presenting themselves for testing, they must not be tested.

4. Upon waking and prior to testing, the subject must not participate in strenuous activities (e.g., bicycle riding, walking long distances greater than 0.25 miles, or running).

5. The subject should arrive at the clinic for testing by vehicle unless otherwise approved by a clinical monitor.

6. The subject should maintain comfortable body temperature by wearing proper clothing.

Treatment of Data:

Blood Glucose Response Curves:

1. The area under the blood glucose response curve (AUC) over the two-hour testing period is calculated using a mathematical algorithm known as the "standard trapezoidal method".

2. Whenever test curves exhibit double peaks, the subject is re-tested on another day.

3. A "flat-line" technique is used to correct the baseline for the glucose threshold effect whereby a rise in blood glucose is too small to elicit adequate insulin response to bring the blood glucose response curve back to the original baseline or the point of fasting blood glucose. A flat-line adjustment is achieved by establishing a new baseline after the 15-minute point in which at least two points show variation not more than ±6 mg/dl. The new baseline must lie below 110 mg/dl. The newly defined baseline is used in the determination of the AUC employing the "standard trapezoidal method".

Bread Standard Filtering and Adjustment to Glucose Scale:

1. For the purpose of controlling bread standard variability and thus test result variability, bread standard values are filtered using a Z-score cutoff so that outliers more than 1.04 standard deviations from the mean (after standardizing the distribution) are removed.

2. The AUC's for the filtered bread standard values are multiplied by 1.40 to convert them to the standard glucose scale.

Disqualification of Individuals Based on High Bread Standard Variability:

1. After filtering, subjects are disqualified when the Coefficient of Variation (i.e., standard deviation divided by the mean) for their bread standards is greater than 40 percent.

Calculations:

1. The glycemic index for each subject is determined by first calculating the average AUC for both the test foods and the bread standards and then dividing the average AUC of the test food by the average AUC of the subject's bread standards (corrected to glucose scale). The glycemic load of the food for each subject is calculated by multiplying the GI by the amount of digestible carbohydrate in a serving of the food.

2. The glycemic load of the food is determined by averaging the GL across all of the qualified test subjects.

2) Viscosity Measurement Method

A hydrated food film's viscosity can be determined using a temperature-controlled Plate and Cone Brookfield Viscometer. Other viscometers can be used, including a spindle-type Brookfield Viscometer. Particular cone or spindle configurations can be selected based on the expected viscosity range, as suggested by the manufacturer's technical literature.

The viscosity of individual hydrocolloids can also be measured, at aqueous concentrations as indicated.

Preparation of a Hydrated Food Film Composition

A hydrated food film composition is made using a laboratory-scale, scraper-type twin shaft mixer including a homogenizer and internal trifoil blade, such as a SEM-TS 10 vac Twin shaft mixer from Buhler, Inc. (Switzerland). The mixer also has vacuum capabilities. Water is added to the mixer and is heated to 86° F. The mixer trifoil blades are adjusted to turn at 30-45 revolutions per minute (rpm) and the homogenizer feature to turn at about 1000 rpm. Typically a hydrated composition of 85% water, and 15% hydrocolloid components is made. For some hydrocolloid compositions, if the mixed composition is pasty or shows signs of incomplete wetting of the solids, then the water content can be increased in increments of 2% until the fully-hydrated liquid composition is made. The hydrocolloid ingredients of the food film composition are dissolved in sequential order and allowed to mix for 5 minutes. The addition order is: rheology modifier/plasticizers; structural/viscous fermentable materials; and ionic property modifiers. The structural/viscous fermentable materials typically are high water binding hydrocolloids, and should be added sequentially in increasing order of water binding capacity. The blade speed is then adjusted to about 100 rpm and homogenizer to about 2000 rpm and mixing is continued for an additional 5 minutes. The blade speed, homogenizer speed and temperature are again increased to 135 rpm, 2525 rpm, and 95° F., respectively. Vacuum is also adjusted to −0.3 bar. The slurry is mixed for an additional 4 minutes. Vacuum is increased to −0.4 to −0.6 bar in the mixer, with the temperature at 95°, the blade speed is reduced to 40 rpm and homogenizer speed reduced to 100 rpm. The slurry is further mixed under these conditions for about 8-10 minutes to remove entrapped air. To further unify the food film composition and eliminate gum agglomerates, the film system is pumped through a bead mill containing 2 mm steel beads having a gap separation of 0.4 mm and run at 86° F. Throughput on the bead mill is about 15-17 kg/hr. The bead mill is available from Buhler, Inc. (Switzerland). The result is the hydrated food film composition.

Preparation and Testing of Dried, Stabilized Food Film Samples

A dried, stabilized food film can be prepared by casting the hydrated food film composition into a Lexan® plate using a Microm film applicator (available from Paul N. Gardner Co., Pompano Beach, Fla.) or knife blade set to a 100 mil clearance. After air drying the films for 24 hours at 60% relative humidity and 22° C., the films are evaluated on an INSTRON Model 1011 tensile-testing instrument, Stevens texture analyzer, a Rheometrics RSA Solids Analyzer (Piscataway, N.J.) using film testing features. Air is used in the film chamber for temperature control on runs beginning from ambient temperature. A nominal strain of 0.1% is used in most cases, with an applied frequency of 10 rad/sec (L59 Hz).

An optional tensile-strength instrument that can be used is a TA.XT2i Texture Analyzer and its Texture Expert (and Texture Expert Exceed) software for Windows (London, England).

EXAMPLES

The examples herein presented are to provide further illustration of the inventions and should in no way be interpreted as being further limiting. In the following examples, the Durum flour is available from North Dakota Mill. The inulin is available as Frutafit® HD from Sensus America, LLC. The guar gum is available from TIC Gums Inc. The sorbitol is available from Roquette. Vital wheat gluten is available from Roquette. The pea fiber is available from Garuda International. The long grain rice is from Rivland. The high methoxy pectin is from CP Kelco. All percentages are by weight percent, unless otherwise indicated.

Example 1

Reduced Digestible Carbohydrate Pasta

Pasta Dough Formula:
Water—23.0%,
Durum Extra Fancy Patent Flour—64.0%,
Inulin—4.5%,
Vital Wheat Gluten—2.5%,
Guar Gum (prehydrated)—1.5%,
Pea Fiber—4.5%

Procedure: The dry ingredients are mixed for 5.0 minutes in a V powder mixer. The pasta is extruded on a Demaco commercial pasta press. The dry ingredients after mixing are fed into a commercial pasta press, where the water is added by mixing into the dry ingredients at a rate to meet the formula level of water and to produce an extrudable dough. The dough is extruded through a pasta die that would produce a Ziti shape. The moisture content of the extruded pasta is 30%. The wet product is dried to 12% moisture using a pasta dryer. The resulting pasta product is determined to have 12 grams of digestible carbohydrate per 56 gram serving. A conventional pasta typically has 42 grams of digestible carbohydrate per 56 gram serving.

Example 2

Reduced Digestible Carbohydrate Pasta

Reduced digestible carbohydrate pasta was made according to the method described in Example 1, using the ingredients shown below. Table C shows the resulting dried pasta compositions. Semolina is available from Dakota Growers. The weight content of semolina includes about 12% water by weight. Vital Wheat Gluten is available from MGP Ingredients, Inc. Modified Wheat Gluten is available as Arise™ 6000 from MGP Ingredients, Inc. Guar gum is available as TIC Prehydrated NT. Xanthan gum is available as Prehydrated Ticaxan. HM Pectin is high methoxyl pectin, available as Kelco 150 B Rapid Set from CP Kelco. Inulin-A is Inulin Frutafit® CLR, and Inulin-B is Frutafit® HD, both available from Sensus America, LLC.

TABLE C

| | Weight % Dried Pasta | | | | | |
| --- | --- | --- | --- | --- | --- | --- |
| | Sample No. | | | | | |
| Ingredient | A | B | C | D | E | F |
| Semolina fine | 91.40 | 91.55 | 90.95 | 91.40 | 91.00 | 91.00 |
| Vital Wheat Gluten | 0.90 | 0.50 | 0.50 | 1.10 | 1.50 | 1.50 |
| Modified Wheat Gluten | 0.60 | 0.60 | 0.60 | 0.00 | 0.00 | 0.00 |
| Xanthan Gum | 1.00 | 1.25 | 1.50 | 1.10 | 1.50 | 1.50 |
| HM Pectin | 0.30 | 0.30 | 0.30 | 0.35 | 0.35 | 0.35 |
| Potassium chloride | 0.30 | 0.30 | 0.30 | 0.30 | 0.30 | 0.30 |
| Inulin-A | 0.00 | 0.00 | 0.00 | 0.00 | 0.00 | 1.50 |
| Sorbitol | 2.50 | 1.50 | 1.65 | 2.50 | 1.50 | 0.00 |
| Inulin-B | 3.00 | 4.00 | 4.20 | 3.25 | 3.85 | 3.85 |

Example 3

Processing of Pasta

A blend of the non-digestible materials was prepared, consisting by weight of 10.46% vital wheat gluten; 6.98% modified wheat gluten; 11.63% xanthan gum; 3.49% high methoxyl pectin; 3.49% potassium chloride; 29.07% sorbitol; and 34.88% inulin. The materials were placed into a 600-liter high intensity mixer (available from Processall, Incorporated, Cincinnati Ohio) and mixed as a batch for 30 seconds at 430 rpm. The mixer was discharged into an identified super sack. The super sack was unloaded into an AccuRate Mechatron® Gravimetric Feeder, which was adjusted to continuously discharge the mixed blend of non-digestible material at a rate equivalent to 8.6% by weight of the total pasta formula. Durum semonlina flour having a minimum powder temperature of 75° F., was combined with the non-digestible material blend in a paddle mixing conveyor, which was running at 50 rpm with a 2-minute retention time. Optionally, reground pasta is typically added with the durum semonlina flour at between 10-15% by weight. Regrind addition has been found to not affect product performance at these addition ranges. In typical commercial facilities, regrind is used since it is made continuously in the process and would build up in as a processing waste if not added back in to the production. The non-digestible material and semolina flour were blend further combined through the augers, rebolt sifters (850 micron) and pneumatic conveying system (these were mechanical components used to transport the materials to the pasta production system). A continuous flow scale measured the combined materials to verify the proper mass flow of the semolina and non-digestible material to the pasta production line, and to quantify the amount of product manufactured in each lot.

At a surge hopper above the production line the semolina/non-digestible material blend temperature was verified to be above 75° F. The semolina/non-digestible material blend was hydrated in a FAVA high speed flour hydrating mixer. Water was added through two opposite locations in the FAVA high speed mixer, which was operated at 1000 rpm. The hydrated material residence time in the high speed mixture was about 8-10 seconds. The water had a temperature of 140° F.±5° F., and was added at a rate of 33-34% by weight of the semolina/non-digestible material blend (or 860 liters per hour). The hydrated dough transfers from the FAVA high speed mixer to a FAVA dough mixer having a residence time of 13 minutes and running at 300 rpm. The dough temperature in this step was maintained between 98-110° F., 98° F. minimum, and the dough moisture was between 30.1 and 30.2%. The mixed dough proceeded to a FAVA vacuum mixer having a residence time of 4-5 minutes and running at 300 rpm. The dough moisture in the vacuum mixer was typically between 29.9% and 30.1%. The conditioned dough continued to a FAVA pasta extrusion press operated with a 45-60 second residence time and running at 20 rpm and 130 bars pressure. The dough moisture at the cutting head at the exit of the pasta press was 28.6%.

Short good, such as elbow macaroni and penne, were evaluated for length specifications. The formed pasta proceeded to a FAVA Multi-stage dryer and the pasta was dried for three hours for short goods, and between six and eight hours for long goods, such as spaghetti and linguine. The drier was run under a temperature profile in four stages including pre-drying, final drying, stabilization and cooling. During the pre-drying stage the drier temperature begins at about 115° F. and increases to about 175° F. over a 1 hour period for long goods, and a proportionally shorter time for short goods. The 175° F. temperature was maintained for about 1.25 hours and then increased to about 195° F. The pasta traveled through the drying stage for an additional 2 hours. The moisture decreased from about 29% to about 19% during these drying stages. The pasta continued through the stabilization stage where the oven temperature was reduced during this stage from 195° F. to about 167° F. over a 0.5 hour period. The pasta spent about 3 hours in the stabilization stage for long goods, and a proportionally shorter time for short goods. At the start of the stabilization stage the pasta was typically about 15% moisture and was typically about 12.5% moisture at the end of this stage. The product then entered the cooling stage where its temperature was reduced to about 82.5° F. The final product moisture after drying was between 11.5-12.0%. The products were packaged in unit one pound boxes for sale.

Example 4

Reduced Digestible Carbohydrate Reconstructed Rice

Formula:
Long Grain Rice Flour—84.30%
Glycerol Monostearate—0.75%
Xanthan Gum—1.30%
High Methoxyl Pectin—0.80
Inulin (CLR)—6.50%
Sorbitol—6.20%
Potassium Chloride—0.20%

Procedure: The dry ingredients are mixed for 5.0 minutes in a V powder mixer. The dry ingredients are metered into a pre-conditioner. Steam and water is added in the pre-conditioner to bring the moisture content of the feed material to the extruder up to approximately 38% and temperature to 88° C. The pre-conditioned product is feed into a Wenger TX-52 twin-screw extruder where the temperature of the product is maintained in the range of 88 to 92° C. The screw configuration provides good mixing prior to passing the product through a die that has been configured to provide typical rice kernel shapes upon being cut at the die. A low pressure is maintained to obtain good product shape. The temperature is maintained below 100° C. to avoid expansion of the product. The dwell time in the extruder is approximately 2 minutes. The moisture content at the die is in the range of 35 to 36%. The product is dried in a pasta-type dryer at about 60° C. and a relative humidity of around 70%. The resulting product is dried to near 12% moisture. The resulting reconstructed rice is determined to have 12 grams of digestible carbohydrate per 56 gram serving. A conventional reconstructed rice typically has 42-45 grams of digestible carbohydrate per 56 gram serving.

Example 5

Reduced Digestible Carbohydrate Restructured French Fry

Reduced digestible carbohydrate potato products are made according to the method described in Example 4, using the ingredients shown below. Potato flour is available from RDO Foods. Guar gum is available as TIC Prehydrated NT. Kappa carragennan is also available from TIC Gums. HM Pectin is high methoxyl pectin, available as Kelco 150 B Rapid Set from CP Kelco. Inulin is Frutafit® HD, available from Sensus America. The sorbitol is available from Roquette. Pea inner fiber is available from Norben Company. White wheat fiber is available from International Fiber Fillers. Soy flour is available from Cenex Harvest States. Methylcellulose is available from FMC Corp.

Formula:
Potato Flour—85.50%
Methylcellulose—2.00%
White wheat fiber—2.00%

Soy flour—2.00%
Pea inner fiber—1.00%
Guar gum—1.00%
Kappa carragennan—0.50%
High Methoxyl Pectin—0.30%
Inulin (HD)—4.00%
Sorbitol—1.00%
Potassium Chloride—0.20%
Calcium chloride—0.50%

Procedure: A homogeneous dry mixture of the components is made by mixing in a V-mixer for 5 minutes. Cold water (50-63° F.) is added to the dry mixture while mixing at medium sheer to produce a cold mash in a ratio of 170 parts water to about 100 parts dry modified flour weight. The resultant cold mash is pressed through a low pressure vertical press containing a suitable die having the desired shape and the length of the resultant strands are cut using a rotating cutting tool. In the case of French fries, the resultant fries are placed in a hot oil cooking basket and either cooked in vegetable oil at 356-365° F. for 90 seconds for immediate consumption or 30-45 seconds and quick frozen for par cooked French fries. In the case of tator tots, the mash is pressed into forms and cooked as for French fries. In the case of hash browns, resultant thin strands of the pressing operation are formed into patties. In the case of restructured potato chips, the cold mash is placed in molds and baked to crispiness.

Example 6

Reduced Digestible Carbohydrate Tortillas

Reduced digestible carbohydrate flour tortillas are made according to the method described in Example 5, using the ingredients shown below. The hard red spring wheat flour is available from Cenex Harvest States. The xanthan gum is available from TIC gums as Prehydrated NT, and HM pectin is available as Kelco 150 B Rapid Set from CP Kelco. The inulin is available from Sensus America, LLC as Frutafit® HD. The vital wheat gluten and modified wheat gluten are available from MGP Ingredients; the modified wheat gluten as Arise® 6000. The sorbitol is available from Roquette America. The calcium propionate is dustless from ADM. The sodium stearoyl lactylate is available from ADM as Paniplex® SK. The mono-diglyceride is also available from ADM as Panolite® 90-03.

Formula:
Hard red spring wheat flour—53.96%
Xanthan gum—1.00%
High Methloxyl pectin—0.30%
Inulin (HD)—3.00%
Sorbitol—2.50%
Vital wheat gluten—0.60%
Modified wheat gluten—0.90%
Potassium chloride—0.30%
Salt—1.23%
Baking powder—0.28%
Potassium sorbate—0.05%
Calcium propionate—2.35%
Sodium stearoyl lactylate—1.55%
Mono-diglyceride—0.38%
General purpose vegetable shortening—5.42%
Water—31.67%

Procedure: The dry components are mixed in a V-powder mixer or other appropriate mixer for 5 minutes. Vegetable shortening is added into the dry blended mixture while mixing for 2 minutes at high speed in a conventional roller or paddle mixer. Add 82-86° F. (28-30° C.) water while mixing a low speed in a roller or paddle mixer. Mixing is continued for an additional 2 minutes. Resultant dough is divided and balled into equal weight portions dependent on the size of tortilla being produced, i.e. 8 inch, 10 inch, 12 inch, etc. The divided dough balls are allowed to proof in a proofing cabinet for 10 minutes. Proofed dough balls are pressed into tortillas using a conventional tortilla press to about 0.008-0.10 inch thick. Tortillas are then baked in a 500° F. (260° C.) direct-fired oven for 30 seconds or until cooked. Baked tortillas are cooled on cooling belt for 3 minutes to a finished moisture of about 30% and less than 90° F. (32° C.). The resulting tortilla is determined to have 6-9 grams of digestible carbohydrate per 61 gram serving. A conventional flour tortilla typically has 28-32 grams of digestible carbohydrate per 61 gram serving.

Example 7

Plasticizer Effects on Mechanical Properties of Food Films

To test the effects of plasticizer level on mechanical properties of films, HM pectin/starch films and xanthan gum/kappa carrageenan/HM-pectin films containing differing levels of plasticizer were prepared. Three HM-pectin/starch films were prepared. A 100% HM pectin, a 95/5-HM-pectin/starch ratio and a 85/15 HM-pectin/starch ratio, with each containing either 9% or 26% glycerin as a plasticizer were prepared. Films containing only HM-pectin films and those containing starch, without any plasticizer, had elongation to break of <100% and had low breaking strengths of 0.5-2.0E+01 dynes/cm$^2$, while films containing 9% glycerin had elongations to break of about 100% and higher breaking strengths of about 1.5 to 2.0E+02 dynes/cm$^2$. Films containing about a 3-fold higher plasticizer level (26% glycerin) had breaking strengths of about 3.5 to 4.0E+08 dynes/cm$^2$ (several orders of magnitude higher than the 9% glycerin-treated films and significantly higher than HM-pectin films without plasticizer addition). The 26% treated HM-pectin films also had elongation of break of about 150-200%. Pure HM pectin and HM pectin/starch blends, with no added plasticizer showed little deformation of E' and E" with increasing temperature. However, use of plasticizer significantly reduced both E' and E" with increasing temperature, particularly over 185° C.

In other example, a film, which can be used in producing pasta with protected carbohydrates, was made containing a pre-dehydrated composition (by weight) of 1.2% xanthan gum, 1.0% kappa carrageenan, 0.6% HM-pectin, 12% polydispersed inulin, 4% sorbitol, 0.2% potassium chloride, and 81% water. The film composition contains about 15% structural/viscous fermentable material and about 85% plasticizer. Breaking strength and elongation to break values were about 5.25 E+05 dynes/cm$^2$ and 150%, respectively, signifying good overall film flexibility and strength.

In yet another example, a film was made containing a pre-hydrated composition (by weight) of 0.4% gellan gum, 1.2% kappa carrageenan, 1.0% guar gum, 12% short chain inulin, 3.8% sorbitol, 0.1% sodium citrate, 0.1% potassium chloride, and 81.4% water. Breaking strengths and elongation to break values consistent with the dried-weight composition of about 14% of various high water binding structural film building components and 85% mixed plasticizer, were about 7.2E+05 dynes/cm$^2$ and 75%, respectively.

We claim:

1. A method for reducing the digestion of a portion of the digestible carbohydrates in a reduced-digestible carbohydrate food formed from a dough, the food selected from the group consisting of a pasta, a noodle and a restructured rice particle, to reduce the glycemic index of the food, comprising the steps of:
- (a) providing a non-digestible protective material, in an amount of at least about 4% and up to about 40% by weight of the food, the non-digestible protective material comprising:
  - (1) a structural material comprising at least one of:
    - (i) a structural/viscous fermentable material selected from the group consisting of carrageenan, alginate, gum arabic, gum tragacanth, karaya gum, guar gum, locust bean gum, tara gum, tamarind gum, arabinoxylans, b-glucans, pectin, cellulose, methyl cellulose, gellan gum, xanthan gum, carboxymethylcellulose, propylene glycol alginate, modified resistant starches, and mixtures thereof, and
    - (ii) a structural protein polymer selected from the group consisting of gluten, modified gluten, casein, soy, whey concentrate, and mixtures thereof; and
  - (2) at least 25%, by weight of the non-digestible protective material, a rheology modifier selected from the group consisting of a fructooligosaccharide, inulin having a degree of polymerization (DP) from about 2-20 and an average DP of about 4-7, polydispersed inulin having a DP from about 2-60 and an average of about 10-12, and mixtures thereof;
- (b) providing a flour that contains discrete units of starch granules, in an amount of at least about 50%, by weight of the food, of the flour selected from the group consisting of flours of wheat, rye, barley, oat, sorghum, rice, corn, legume, pea, and potato, and mixtures thereof,
- (c) mixing intimately the non-digestible protective material with the flour in the presence of water to form a dough having a modified matrix structure that comprises the discrete units of starch granules that comprise available carbohydrate, and a protective food film network that includes the non-digestible protective material, which surrounds the discrete units of starch granules to provide protection of a portion of the available carbohydrate from digestion in the small intestine when the reduced digestible carbohydrate food is eaten, and
- (d) extruding the dough and drying the dough, to form the food, wherein the glycemic index of the food is at least 30% less than the glycemic index of a conventional food made from the flour, excluding any dilution of the food by the non-digestible protective material.

2. The method according to claim 1 wherein the provided non-digestible protective material is in the form of a prehydrated aqueous slurry.

3. The method according to claim 1 wherein the provided non-digestible protective material is in a particulate form, and the step of mixing intimately includes hydrating the non-digestible protective material with the water.

4. The method according to claim 1 wherein at least about 50% of the available digestible carbohydrate of the reduced-digestible carbohydrate food is a protected carbohydrate.

5. The method according to claim 4 wherein at least about 70% of the available digestible carbohydrate of the reduced-digestible carbohydrate food is the protected carbohydrate.

6. The method according to claim 5 wherein at least about 90% of the available digestible carbohydrate of the reduced-digestible carbohydrate food is the protected carbohydrate.

7. The method according to claim 1 wherein the step of mixing intimately comprises mixing under applied shear.

8. The method according to claim 1 wherein the formed protective food film network forms a protective barrier by encapsulating, coating and segregating the starch granules from digestive enzymes.

9. The method according to claim 1, wherein the food is selected from the group consisting of the pasta and the noodle, and the provided flour is at least about 75% by weight, the provided non-digestible protective material is at least about 5% and up to about 40%, with the non-digestible protective material comprising at least about 25%, and up to about 90%, the rheology modifier further includes a compound selected from the group consisting of polyol, glycerin, polydextrose, and a mixture thereof, wherein the structural/viscous fermentable material is selected from the group consisting of high methoxyl pectin, xanthan gum, and mixtures thereof, and wherein the structural protein polymer is selected from the group consisting of vital wheat gluten, modified wheat gluten, and mixtures thereof; and further comprising the step of providing an ionic property modifier selected from the group consisting of one or more divalent and monovalent chloride and citrate salts, in an amount of at least about 1%, and up to about 5%, by weight of the non-digestible protective material.

10. The method according to claim 9, wherein the provided ionic property modifier is in an amount of about 2% to about 4%.

11. The method according to claim 1, wherein the food is the restructured rice particle, and the provided flour is at least about 75% rice flour; the provided non-digestible protective material at least about 4% and up to about 20%, with the non-digestible protective material comprising up to about 80% of the rheology modifier further includes polyol, wherein the structural/viscous fermentable material is selected from the group consisting of methyl cellulose, high methoxyl pectin, carrageenan, guar gum, gum arabic, and mixtures thereof; and further comprising the step of providing an ionic property modifier selected from the group consisting of one or more divalent and monovalent chloride and citrate salts, in an amount of at least about 1%, and up to about 5%, by weight of the non-digestible protective material.

12. The method according to claim 11, wherein the provided ionic property modifier is in an amount of about 2% to about 4%.

13. The method according to claim 1, wherein the step of mixing further includes an ionic property modifier selected from the group consisting of one or more divalent and monovalent chloride and citrate salts, in an amount of at least about 1%, and up to about 5%, by weight of the non-digestible protective material.

14. The method according to claim 1, wherein the formed modified matrix structure of the dough, after drying the dough to the pasta, noodle or restructured rice particle and following cooking of the pasta, noodle or restructured rice particle, provides starch granules that are less swollen or gelatinized, as compared to a cooked conventional pasta, noodle or restructured rice particle.

15. The method according to claim 1, wherein the flour is at least 75% by weight of the food.

16. The method according to claim 15, wherein the flour is at least 85% by weight of the food.

* * * * *